(12) United States Patent
Koike et al.

(10) Patent No.: US 8,127,364 B2
(45) Date of Patent: Feb. 28, 2012

(54) ELECTRONIC APPARATUS AND INFORMATION PROCESSING APPARATUS

(75) Inventors: Nobuyuki Koike, Kawasaki (JP); Kouichi Aida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 12/239,948

(22) Filed: Sep. 29, 2008

(65) Prior Publication Data

US 2009/0025091 A1    Jan. 22, 2009

(51) Int. Cl.
| | |
|---|---|
| G06F 7/04 | (2006.01) |
| G06F 17/30 | (2006.01) |
| G06F 1/26 | (2006.01) |
| G06F 11/00 | (2006.01) |
| H04N 7/16 | (2006.01) |
| G08B 13/00 | (2006.01) |
| G08B 21/00 | (2006.01) |
| G08B 29/00 | (2006.01) |

(52) U.S. Cl. ............................................ 726/26; 726/34
(58) Field of Classification Search .................... 726/26, 726/34
See application file for complete search history.

(56) References Cited

U.S. PATENT DOCUMENTS

| | | | |
|---|---|---|---|
| 4,630,936 | A | 12/1986 | Leuenberger |
| 2003/0005336 | A1 | 1/2003 | Poo et al. |
| 2003/0005337 | A1 | 1/2003 | Poo et al. |
| 2005/0206353 | A1 | 9/2005 | Sengoku |
| 2006/0026673 | A1 | 2/2006 | Tsuchida |
| 2007/0079381 | A1* | 4/2007 | Hartung et al. .................. 726/26 |
| 2009/0214042 | A1* | 8/2009 | Nakahara et al. ............. 380/278 |

FOREIGN PATENT DOCUMENTS

| | | |
|---|---|---|
| JP | 61-237082 | 10/1986 |
| JP | 7-225704 | 8/1995 |
| JP | 2001-22521 | 1/2001 |
| JP | 3085361 | 2/2002 |
| JP | 2005-267533 | 9/2003 |
| JP | 3101222 | 2/2004 |
| JP | 2004-213323 | 7/2004 |
| JP | 2004-519791 | 7/2004 |
| JP | 2005-80233 | 3/2005 |
| JP | 2006-40197 | 2/2006 |
| JP | 2006-41968 | 2/2006 |

OTHER PUBLICATIONS

English language International Search Report mailed Jul. 4, 2006, for International Application No. PCT/JP2006/306739.

* cited by examiner

*Primary Examiner* — Peter Poltorak
*Assistant Examiner* — Benjamin Kaplan
(74) *Attorney, Agent, or Firm* — Staas & Halsey LLP

(57) ABSTRACT

The electronic apparatus includes: a timer for measuring an elapse time duration under a component-disengaged state after detection of the disengaged state by the sensor; a copy controlling unit for making data stored in the recording unit to be copied in a storage unit of the information processing apparatus; and a deleting unit for deleting data stored in the recording unit. The copy controlling unit makes data stored in the recording unit to be stored in the storage unit of the information processing apparatus when the timer detects elapse of a first predetermined time duration, and the deleting unit deletes data stored in the recording unit when data stored in the recording unit is copied in the storage unit. This makes it possible to prevent loss of data stored in the recording unit of the electronic apparatus, and to improve data confidentiality, and to prevent confidential information leakage.

20 Claims, 14 Drawing Sheets

ELECTRONIC APPARATUS AND INFORMATION PROCESSING APPARATUS

CROSS REFERENCE TO RELATED APPLICATION(S)

This application is based upon and claims priority to PCT Application PCT/JP2006/306739 filed on Mar. 30, 2006, the entire contents of which are incorporated herein by reference.

TECHNICAL FIELD

The present invention relates to the technology for using an electronic apparatus such as a USB memory and an information processing apparatus with connection therebetween.

BACKGROUND ART

Recently, portable data storage apparatuses, such as a USB (Universal Serial Bus) memory, provided with (i) a connection terminal (USB connector) for connection thereof with a computer and (ii) a memory operable to store data therein, have been widely used.

Such a USB memory is carried by a user and connected to a USB port of a computer at the place where the user is (the place to which the user has moved) by means of inserting the connector (USB connector) of the USB memory into the USB port. The user accesses the internal memory of the USB memory from the computer to perform data reading, data storing, data deleting or the like to the internal memory of the USB memory apparatus.

Patent Document 1: Published Japanese Translation of a PCT Application No. 2004-519791

DISCLOSURE OF THE INVENTION

Issue(s) to be Solved by the Invention

Such previous USB memories, however, have problems as follows: after using a USB memory with insertion thereof into a computer which is installed at the place where a user goes and stays, the USB memory is sometimes left in a state where the USB memory is being inserted to the information processing apparatus, so that it can occur that the USB memory is left behind.

Such an occurrence of leaving a USB memory behind or loss of it will result in loss of the data stored in the memory. Moreover, in a case where the USB memory stores confidentially important data, there is a possibility of leakage of this confidential data.

Further, in order to improve the confidentiality of data stored in a USB memory, the above patent document 1, for example, discloses a method for constructing a USB memory with an authentication module employing a fingerprint sensor and a non-volatile memory. In the patent document 1, the fingerprint sensor reads the fingerprint of a user, and then permits the user to access the non-volatile memory when the read-out fingerprint matches any of the fingerprints having been registered beforehand. Contrarily, when the read-out fingerprint does not match any of the registered fingerprint, access to the non-volatile memory is refused. With such a method, the data security in the USB memory is realized.

However, it is impossible for the USB memory of the patent document 1 to prevent a USB memory from being left behind. In addition, since an authentication module must be provided for the USB memory, a problem is caused of increasing in manufacturing cost of such USB device.

The present invention is proposed with the foregoing problems in view, and one object of the present invention is to make it possible to prevent loss of data stored in the recording units provided for electronic apparatuses. Another object of the invention is to improve the confidentiality of the data, and a yet another object of the invention is to make it possible to prevent the leakage of confidential information or the like.

Means to Solve the Issue(s)

In order to accomplish the above objects, as a generic feature of the present invention, there provided is an electronic apparatus including: a communication unit for connecting the electronic apparatus to an information processing apparatus in a communicable manner therebetween; and a recording unit adapted to store data therein, the electronic apparatus comprising: a sensor which detects a disengaged state of a component which is adapted to be engaged with the electronic apparatus in a detachable manner, the sensor; a timer (a third timer) which measures a time duration that elapses under a component-disengaged state after the component-disengaged state is detected by the sensor; a copy controlling unit which makes the data stored in the recording unit to be copied in a storage unit provided for the information processing apparatus; and a deleting unit which deletes the data stored in the recording unit. The copy controlling unit makes the data stored in the recording unit to be stored in the storage unit provided for the information processing apparatus in a case where the timer detects elapse of a first predetermined time duration (a fifth predetermined time duration), and the deleting unit deletes data stored in the recording unit in a case where data stored in the recording unit is copied in the storage unit.

As a preferred feature, the deleting unit deletes data stored in the recording unit when the timer detects elapse of a second predetermined time duration (a sixth predetermined time duration) in a case where data stored in the recording unit is copied in the storage unit.

As another preferred feature, the copy controlling unit makes the data stored in the recording unit to be copied in the storage unit of the information processing apparatus in a case where the information processing apparatus has a specific relationship with a specific relating person who has a specific relationship with the electronic apparatus.

As yet another preferred feature, the electronic apparatus further comprises: an unused state detecting unit which detects transition of the information processing apparatus to an unused state thereof, and the copy controlling unit makes data stored in the recording unit to be copied in the storage unit of the information processing apparatus when the unused state detecting unit detects transition of the information processing apparatus into an unused state thereof.

As still another preferred feature, the unused state detecting unit detects transition of the information processing apparatus to the unused state thereof by means of detecting power-off of the information processing apparatus.

As a further preferred feature, the unused state detecting unit detects transition of the information processing apparatus to the unused state thereof by means of detecting shifting of the information processing apparatus into a power-saving operation mode.

As a yet further preferred feature, the electronic apparatus further comprises: a user detecting unit which detects the presence of a user of the information processing apparatus, and the unused state detecting unit detects transition of the information processing apparatus to the unused state thereof when the user detecting unit does not detect anymore the presence of the user detected thereby.

As a still further preferred feature, the copy controlling unit makes the data stored in the recording unit to be copied in the storage unit of the information processing apparatus in a case where a user of the electronic apparatus is a specific relating person who has a specific relationship with the electronic apparatus.

As another preferred feature, the electronic apparatus further comprises: a copy inhibiting unit which inhibits copying of data in the storage unit, which copying is performed by the copy controlling unit.

As yet another preferred feature, the copy inhibiting unit inhibits the copy controlling unit from copying data in the storage unit in a case where a user of the electronic apparatus is not a specific relating person who has a specific relationship with the electronic apparatus.

As a still another preferred feature, the electronic apparatus further comprises: an access inhibiting unit which inhibits the information processing apparatus from accessing the recording unit.

As a further preferred feature, the access inhibiting unit inhibits the information processing apparatus from accessing the recording unit in a case where a user of the electronic apparatus is not a specific relating person who has a specific relationship with the electronic apparatus.

As another generic feature, there provided is an information processing apparatus, comprising: a connection unit to which an electronic apparatus, including: a communication unit enabling communication with the information processing apparatus; a storage unit which is adapted to store data therein is connected in a communicable manner; a copy controlling unit which makes the data stored in the recording unit of the electronic apparatus to be copied in the storage unit upon elapse of a first predetermined time duration (a fifth predetermined time duration) under a state in which a component adapted to be attached to/detached from the electronic apparatus is disengaged from the electronic apparatus; and a deleting unit which deletes data stored in the recording unit of the electronic apparatus upon elapse of a second predetermined time duration (a sixth predetermined time duration) under a state in which the component of the electronic apparatus is disengaged therefrom.

As a preferred feature, the information processing apparatus further comprises: the unused state detecting unit which detects transition of the information processing apparatus to the unused state thereof, and the copy controlling unit makes data stored in the memory unit to be copied in the storage unit of the information processing apparatus when the unused state detecting unit detects transition of the information apparatus when the unused state detecting unit detects transition of the information apparatus to an unused state thereof.

As another preferred feature, the deleting unit deletes data stored in the recording unit in a case where a user of the information processing apparatus is a specific relating person having a specific relationship with the information processing apparatus.

As yet another preferred feature, the information processing apparatus further comprises: a user detecting unit which detects the presence of a user of the information processing apparatus, and the unused state detecting unit detects transition of the information processing apparatus to an unused state thereof when the user detecting unit does not detect anymore the presence of the user detected thereby.

As still another preferred feature, the information processing apparatus further comprises: a storage time limit setting unit which is operable to set a storage time limit to the data stored in the recording unit or the storage unit; an elapse time obtaining unit which obtains a time duration that elapses after the latest access to the data stored in the recording unit or the storage unit; and an alerting unit which gives an alert in a case where the elapse time duration is longer than the storage time limit.

As a further preferred feature, the deleting unit, which is operable to delete the data stored in the recording unit or the storage unit, deletes the data in a case where the elapse time duration becomes longer than the storage time limit and reaches a third predetermined time duration.

As a yet further preferred feature, an alert is given when a time duration not shorter than a fourth predetermined time duration elapses under a connection state in which the electronic apparatus is connected to the connection unit after the electronic apparatus is connected to the connection unit.

As a still further preferred feature, an alert is given when a time duration not shorter than a third predetermined time duration elapses after the latest access to the data stored in the recording unit.

EFFECTS OF THE INVENTION

According to the present invention, at least any one of the following effects and benefits are obtained.

(1) Since it is possible to make a user of the electronic apparatus recognize that the electronic apparatus is being in use, leaving the electronic apparatus behind or the like can be prevented.

(2) Since it is possible for a user to know that the remaining battery amount becomes small, the eventualities caused by the shortage of the remaining battery can be prevented.

(3) The reliability of the electronic apparatus is improved.

(4) Since the battery is rechargeable, the convenience of the electronic apparatus is improved.

(5) The reliability is improved.

(6) The data security is improved, and the leakage of confidential information is prevented.

(7) It is possible to prevent a user from troublesome feeling brought about by being alerted.

(8) It is possible to protect the data in the electronic apparatus and the information processing apparatus from being illegally used by a third person.

Figure 1:
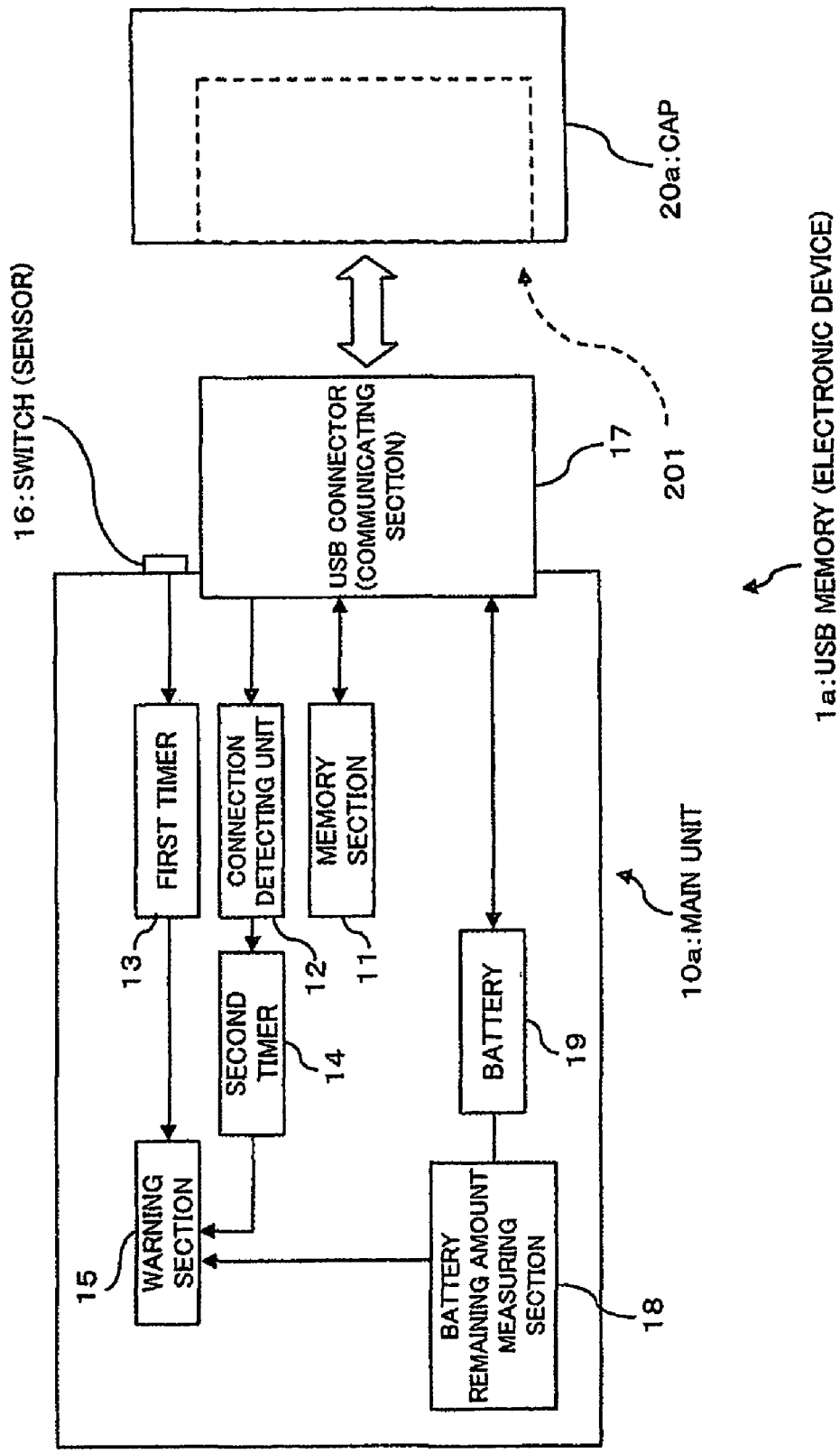
FIG. 1 is a diagram schematically showing a functional construction of a USB (Universal Serial Bus) memory according to a first embodiment of the present invention.

DESCRIPTION OF REFERENCE CHARACTERS 1a, 1b, 1c, 1d, 1e, 1f, 1g, and 1h . . . USB memory (electronic apparatus)
10a, 10b, 10c, 10d, 10e, 10f, 10g, and 10h . . . main body unit
11 . . . recording unit
12 and 45 . . . connection detector
13, 13-1, and 13-2 . . . first timer (timer)
14 . . . second timer
15, 15-1, 15-2, and 37 . . . alerting unit
16, 16-1, and 16-2 . . . switch (sensor)
17 . . . USB connector (communication unit, connection terminal)
18, 18-1, and 18-2 . . . battery measuring unit
19, 19-1, and 19-2 . . . battery
20a, 20b, 20c, 20d, and 20f . . . cap (component)
30a, 30e, 30g, and 30h . . . PC (information processing apparatus, computers
32 . . . storage unit
33 . . . alert controller
34 . . . unused state detector
35 . . . user detector
36 . . . timer
38 . . . user confirming unit
39 . . . user information obtaining unit
40 . . . USB memory confirming unit
41 . . . copy inhibitor
42 . . . access inhibitor
43 . . . elapse time obtaining unit
44 . . . storage time limit setting unit
46 . . . management unit
101 . . . microcomputer
102 . . . processor
103 . . . RAM
104 . . . control soft ROM
105 . . . timer
106 . . . USB interface
107 . . . . Flash memory interface
108 . . . buzzer circuit
109 . . . cap detection switch
110 . . . flash memory
112 . . . power circuit
113 . . . charge circuit
191 . . . electrode
201 . . . engagement opening
301 . . . CPU
302 . . . ROM
303 . . . RAM
304 . . . display
305 . . . HDD (storage unit)
306 . . . keyboard
307 . . . mouse
308 . . . USB controller

BEST MODE FOR CARRYING OUT THE INVENTION

Preferred embodiments of the present invention will now be described with reference to the relevant accompanying drawings.

(A) First Embodiment

FIG. 1 is a diagram schematically showing a functional construction of USB (Universal Serial Bus) memory according to a first embodiment of the present invention.

As shown in FIG. 1, a USB memory (electronic apparatus) 1a according to the first embodiment includes: a main body unit 10a having a USB connector (communication unit, connection terminal) 17 and a storage unit 11; and a cap (component) 20a which is formed in such a manner that it is removable from the USB connector 17. The USB connector 17 is inserted/connected to a USB port 31 of a PC (Personal Computer; information processing apparatus, computer) 30a (see FIG. 3), the USB memory 1a being thereby connected to the PC 30a in a communicable manner therebetween. The PC 30a accesses the storage unit 11 to perform processing such as reading, writing, and deleting of data or files (hereinafter will be simply called "data"). In this instance, this USB memory 1a is also a portable storage apparatus.

As shown in FIG. 1, the main body unit 10a of the USB memory 1a includes: a storage unit 11; a connection detector 12; a first timer 13; a second timer 14; an alerting unit 15; a switch 16; a USB connector 17; a battery measuring unit 18; and a battery 19.

The storage unit 11 stores various kinds of data therein in such a manner that the stored data can be read out. The USB connector 17, which is a connector (male) formed in line with the Universal Serial Bus regulations, can be inserted/connected to a variety of types of electronic apparatuses (for example, the PC 30a in the first embodiment) that are provided with USB ports 31 [USB connectors (female); see FIG. 3] formed in line with the same USB regulations.

The connection detector 12 detects that the main body unit 10a of the USB memory 1a is connected to the PC 30a via the USB connector 17. In this instance, such detection of connection to the PC 30a by the connection detector 12 can be realized by using a variety of types of already known methods. Further, upon detection that the USB memory 1a is connected to the PC 30a, the connection detector 12 outputs a signal (connection detection signal) informing as such to the second timer 14.

In the following description, connecting the main body unit 10a of the USB memory 1a to the PC 30a via the USB connector 17 will sometimes be simply referred to as connecting the USB memory 1a to the PC 30a for the convenience of description.

The cap 20a, which is engaged with the USB connector 17 when the USB memory 1a is not being used, protects the USB memory 1a and the USB connector 17 from physical and electrical stimulations and prevents the intrusion of dirt and dust. The cap 20a is made from, for example, insulation material such as resin.

The cap 20a has an engagement opening 201 which has a shape approximately the same as that of the USB connector 17 and into which the USB connector 17 can be inserted. The USB connector 17 is fit together with the engagement opening 201 by insertion, thereby being mounted to the USB connector 17. That is, the cap 20a is constructed in such a manner that it is detachable from the USB connector 17, which makes the cap 20a detachable from the main body unit 10a (USB memory 1a).

Further, in the USB memory 1a according to the first embodiment, the switch 16 provided adjacent to the USB connector 17 of the main body unit 10a is pushed down by a part of the cap 20a or the like when the cap 20a is mounted to the USB connector 17.

The switch (sensor) 16 detects an uncapped state of the cap 20a in which the cap 20a is uncapped from the USB connector 17. Upon detecting that the cap 20a is uncapped from the USB connector 17 (falls in the uncapped state), the switch (sensor) 16 outputs a signal (an uncapped state detection signal) informing as such to the first timer 13.

The first timer 13 measures a time duration that elapses under a state in which the cap 20a is uncapped, from when the switch 16 detects that the cap 20a is uncapped. Upon reception of a disengaged state detection signal from the switch 16, the first timer 13 starts measuring (countdown). Then, upon elapse of a predetermined time duration (a first predetermined time duration), which has been set beforehand, the first timer 13 outputs a signal (first predetermined time detection signal) informing as such to the alerting unit 15, which will be described later.

The second timer 14 measures a time duration that elapses under a connection-established state, in which the USB connector 17 is connected to the PC 30a, from when the connection detector 12 detects that the USB connector 17 is connected to the PC 30a. Upon reception of a connection detection signal from the connection detector 12, the second timer 14 starts measuring (countdown). Then, upon elapse of a predetermined time (a second predetermined time duration), which has been set beforehand, the second timer 14 outputs a signal (second predetermined time duration detection signal) informing as such to the alerting unit 15, which will be described later.

The battery 19, which supplies electricity to each of the units, such as the alerting unit 15 which will be described later, of the main body unit 10a of the USB memory 1a, is formed by a rechargeable battery, to which electricity is chargeable.

A USB has a bus power (USB bus power) function of supplying electricity from the main body of the computer to peripheral equipment through a USB connector and a USB cable. According to the present embodiment, also, electricity is supplied from the PC 30a to the main body unit 10a through the USB connector 17 and the USB port 31 under a state in which the USB memory 1a (main body unit 10a) is connected to the PC 30a.

Then, the battery 19 is automatically charged with electricity supplied from the PC 30a via the USB connector 17 and the USB port 31 under a state in which the USB memory 1a (main body unit 10a) is connected to the PC 30a.

The battery measuring unit 18 measures the remaining mount (battery amount) of the battery 19. When detecting that the remaining battery amount is not larger than a predetermined amount as a result of comparison between the measured remaining battery amount of the battery 19 and a predetermined amount having been set beforehand, the battery measuring unit 18 outputs a signal (remaining amount detection signal) informing as such to the alerting unit 15, which will be described below.

The alerting unit 15 gives a user of the USB memory 1a an alert. The alerting unit 15 calls the user's attention by means of giving any stimulation to the user's five senses (of seeing, hearing, touching, tasting, and smelling) or the like. In this instance, in the present embodiment, a description will be made of an example in which the alerting unit 15 generates a sound at a specific frequency (alarming sound), thereby giving the user an alert effecting to the user's sense of hearing.

Then, the alerting unit 15 gives an alert when the first timer 13 detects that the first predetermined time duration elapses. Concretely, the alerting unit 15 gives an alert when it receives the first predetermined time duration detection signal from the first timer 13.

Further, the alerting unit 15 gives an alert also when the second timer 14 detects that a second predetermined time duration elapses. Concretely, upon reception of a second predetermined time duration detecting signal from the second timer 14, the alerting unit 15 gives an alert.

Still further, the alerting unit 15 gives an alert also when it is detected that the remaining amount of the battery 19 is not larger than a predetermined amount. Concretely, upon reception of a remaining amount signal from the battery measuring unit 18, the alerting unit 15 gives an alert.

In this instance, in the USB memory 1a according to the first embodiment, the alerting unit 15 generates an alarming sound, thereby giving a user an alert, in a case where the first predetermined time duration detection signal is received from the first timer 13, and in a case where the second predetermined time duration detection signal is received, and in a case where the remaining amount of the battery 19 is detected to be not larger than a predetermined amount. In the above cases, the generated alarming sounds can be the same or different from each other (at different frequencies). Further, the same alarming sound can be generated in any of the parts of the cases.

Figure 2:
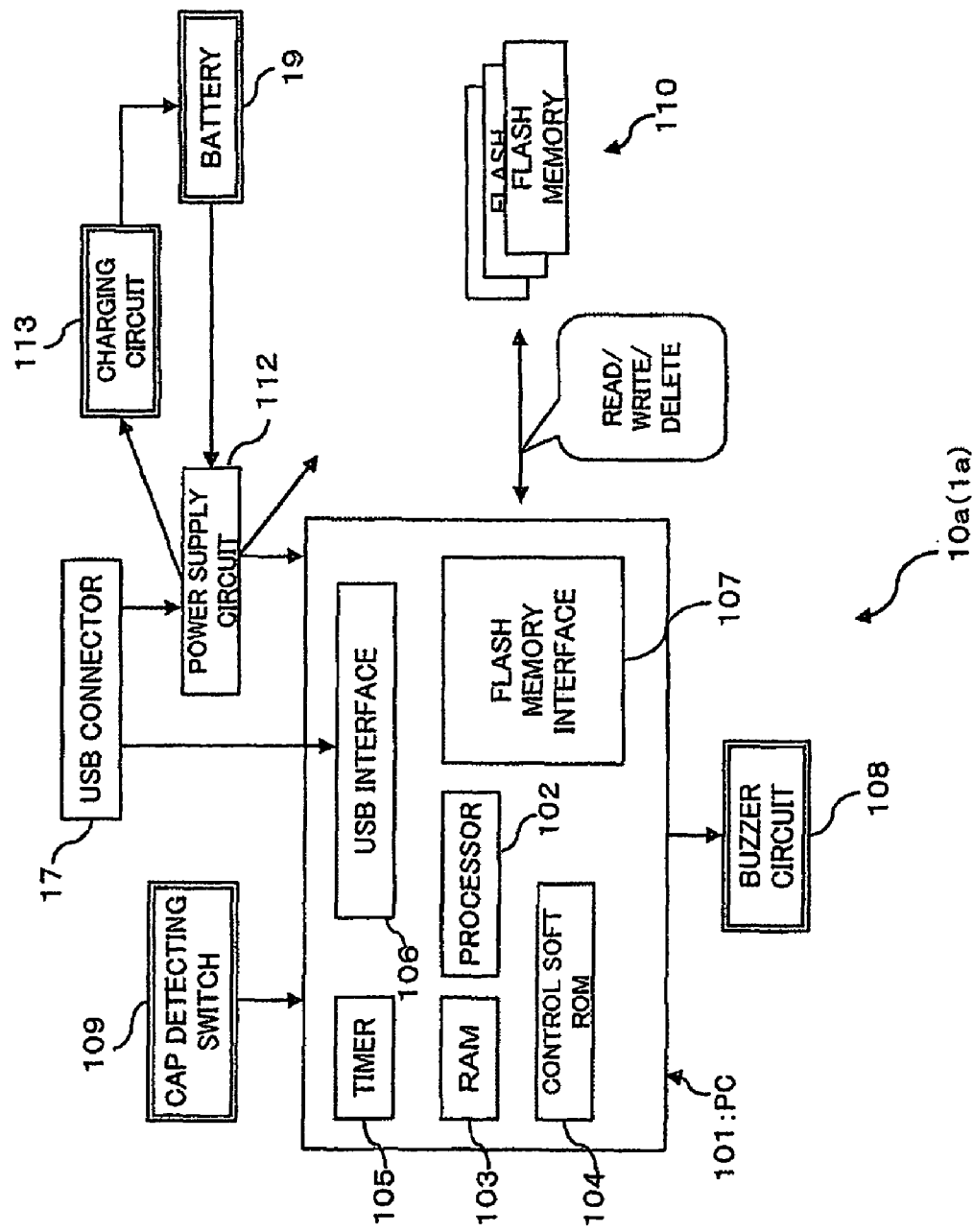
FIG. 2 is a diagram schematically showing a hardware construction of the USB memory according to the first embodiment of the present invention.

FIG. 2 is a diagram schematically showing a hardware construction of the USB memory 1a according to the first embodiment of the present invention.

Here, in the figure, since the reference characters that are the same as those which are already described indicate the same or approximately the same parts, their detailed descriptions will be omitted.

As shown in FIG. 2, the main body unit 10a of the USB memory 1a according to the first embodiment includes: a microcomputer 101; a buzzer circuit 108; a cap detection switch 109; a USB connector 17; a power circuit 112; a charge circuit 113; a battery 19; and a flash memory 110.

The cap detection switch 109, which is formed by, for example, a push switch, is pressed down under a state in which a cap 20a is mounted to the USB connector 17 and is released when the cap 20a is disengaged from the USB connector 17. This cap detection switch 109 functions as the switch (sensor) 16 shown in FIG. 1. In this instance, the cap detection switch 109 should by no means be limited to a push switch, and various changes or modifications thereof may be suggested without departing from the gist of the invention.

The power circuit 112 performs controlling of supply of electricity (bus power), supplied through the USB connector 17 and from the battery 19, to each part of the main body unit 10a. Further, the power circuit 112 measures the remaining amount of battery 19, and also controls the charge circuit 113 to charge the battery 19. That is, this power circuit 112 functions as the battery measuring unit 18 shown in FIG. 1.

The charge circuit 113, which charges the battery 19 based on control performed by the power circuit 112, performs charging of the battery 19 with electricity supplied through the USB connector 17.

The flash (FLASH) memory 110, which is a semiconductor memory to which data deleting and data writing can be performed freely, is constructed in such a manner that the data stored therein does not vanish even after power is turned off and functions as the storage unit 11 shown in FIG. 1. In this flash memory 110, data reading, data writing, and data deleting (reading/writing/deleting) or the like is performed based on control of the flash (FLASH) memory interface 107 performed by the microcomputer 101.

In this instance, FIG. 2 shows an example in which more than one (three in the figure) flash memory 110 is provided. However, the present invention should by no means be limited to this, and flash memories 110 of the number not larger than two or not smaller than four can be provided.

The microcomputer 101, which performs various kinds of controlling in the USB memory 1a, is constructed as an integrated circuit. As shown in FIG. 2, the microcomputer 101 includes: a processor 102; a RAM 103; a control soft ROM 104; a timer 105; a USB interface 106; and a flash (FLASH) memory interface 107.

The control soft ROM 104 stores various types of programs for realizing a function as the microcomputer 101.

The processor 102 executes such programs stored in the control soft ROM 104, thereby performing various kinds of controlling for realizing a function as the microcomputer 101.

The RAM 103 temporarily stores therein data and programs which are used at the time the processor 102 executes the programs.

The timer 105, which measures varying time durations, is formed as, for example, a counter, and it functions as the first timer 13 and the second timer 14 shown in FIG. 1.

The USB interface 106 controls various kinds of controlling for communicating with the PC 30a through the USB connector 17 and the USB port 31. Further, the USB interface 106 detects that the USB memory 1a is connected to the USB port 31 of the PC 30a through the USB connector 17, and it functions as the connection detector 12 shown in FIG. 12.

The flash memory interface 107 performs controlling of data reading, data writing, data deleting (reading/writing/deleting) or the like in the flash memory 110.

The buzzer circuit 108, which outputs an alarming sound at a predetermined frequency in accordance with control by the microcomputer 101, functions as the alerting unit 15 shown in FIG. 1. This buzzer circuit 108 can be realized by using various types of already known circuits.

Here, this buzzer circuit 108 may automatically stop the alarming sound, for example, after outputting it for a predetermined time duration having been set beforehand, and also may stop the outputting of the alarming sound at the time any incoming input is performed. Various changes or modifications may be suggested without departing from the gist of the invention.

In this instance, such incoming inputs can be input operations of some kind by a user or the like, and includes inputting of a signal which is outputted in response to, for example, detection that the cap 20a is engaged with the USB connector 17.

Further, the USB memory 1a has a power switch for controlling ON/OFF (power on/power off) of electricity supply from the battery 19 to each part of the main body unit 10a. In this instance, according to the present embodiment, it is preferable that the function as the power switch is provided for, for example, the switch 16 (cap detection switch 109) and then power is turned on by means of detecting that the cap 20a is disengaged from the USB connector 17.

Still further, instead of making the switch 16 (cap detection switch 109) function as a power switch, another separate power switch can be provided.

Figure 3:
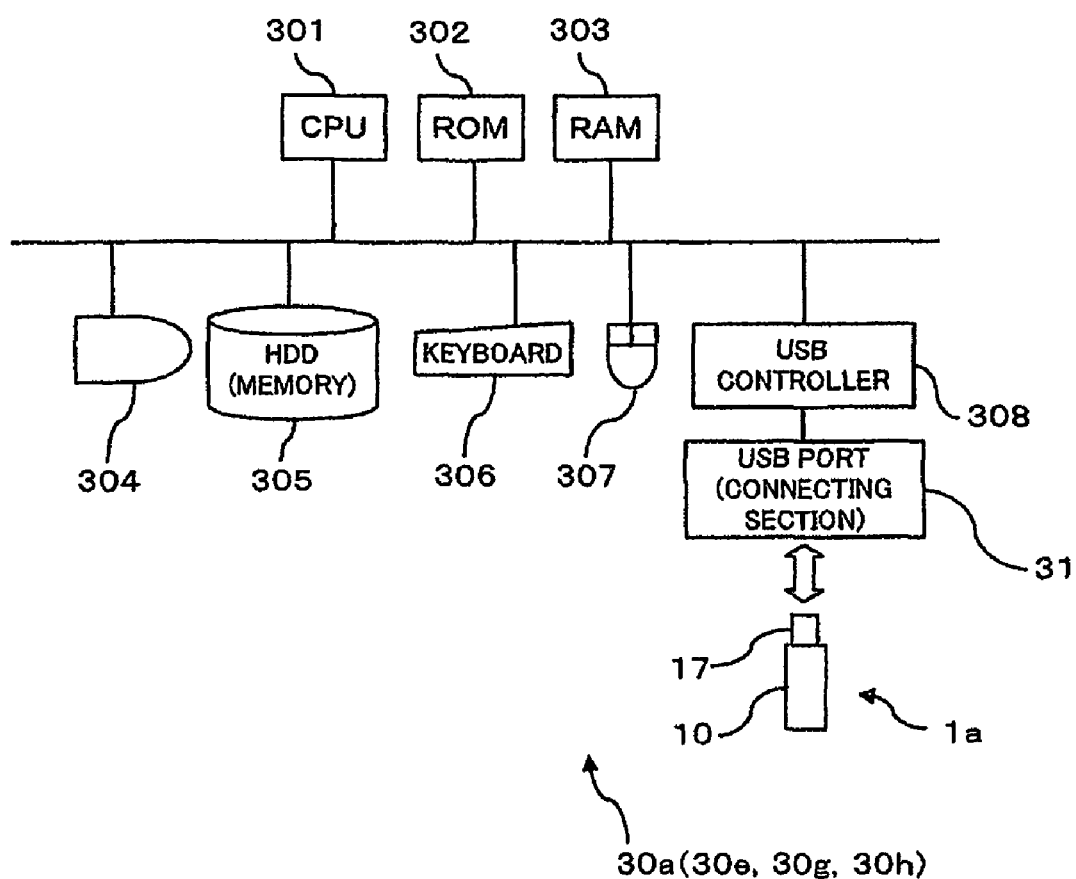
FIG. 3 is a diagram schematically showing a hardware construction of a PC to which the USB memory is coupled according to the first embodiment of the present invention.
Figure 4:
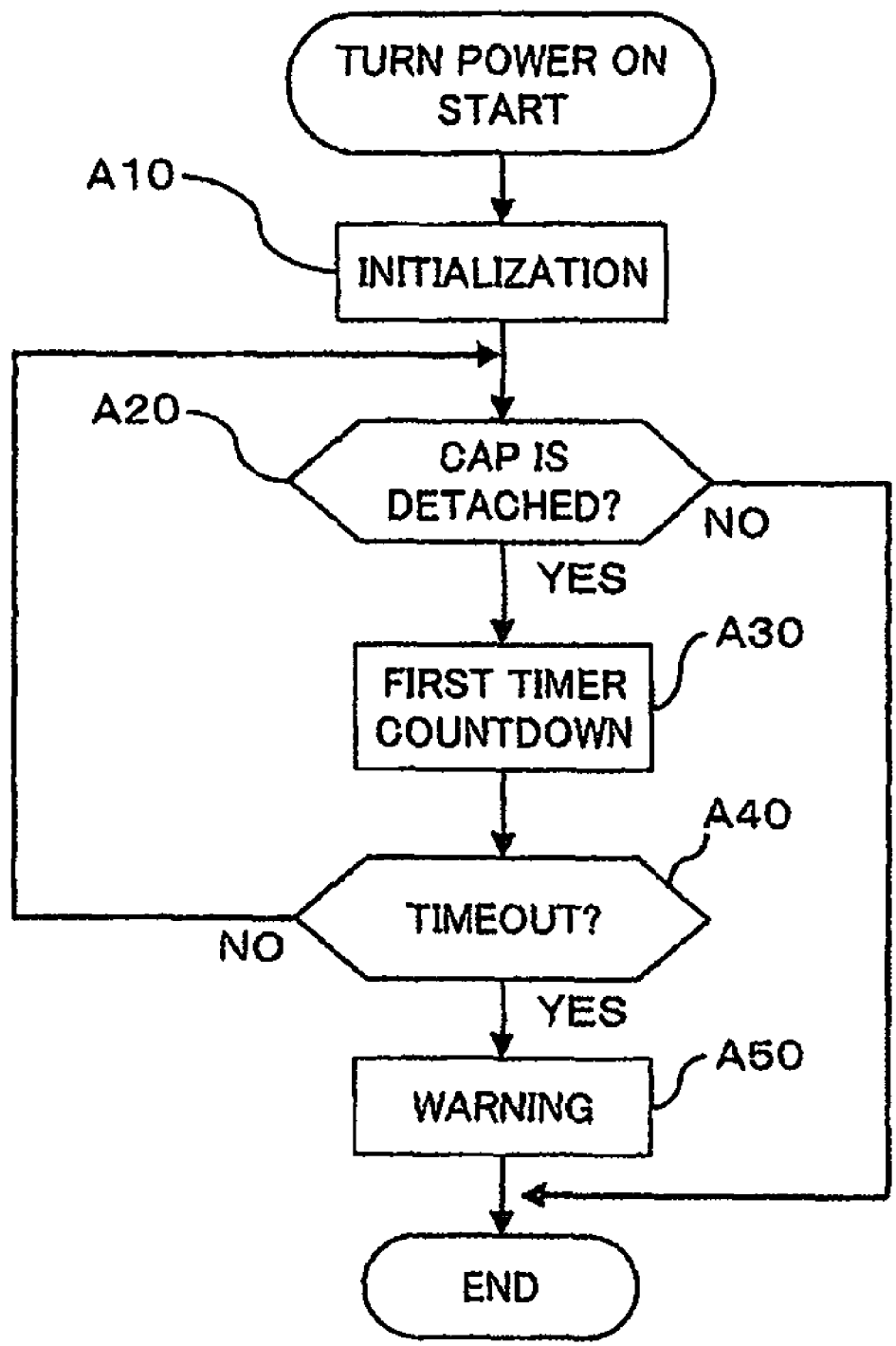
FIG. 4 is a flowchart for describing processing for uncapping the cap of the USB memory according to the first embodiment of the present invention.

FIG. 3 is a diagram schematically showing a hardware construction of a PC 30a to which the USB memory 1a is connected according to the first embodiment of the present invention.

As shown in FIG. 3, the PC (information processing apparatus) 30a includes: a CPU 301; a ROM 302; a RAM 303; a display 304; an HDD 305; a keyboard 306; a mouse 307; a USB controller 308; and a USB port (USB connector, connection unit) 31.

The CPU (Central Processing Unit) 301, executes programs stored in the HDD 305 and the ROM 302, thereby performing various kinds of calculation operation processing, and performs various kinds of controlling in the PC 30a.

The ROM (Read Only Memory) 302 stores programs and data used by the CPU 301; the RAM 303 temporarily stores programs and data used by the CPU 301.

The display 304 is a display device which shows various types of information; the HDD (Hard Disk Drive) 305 is a storage device which holds and stores therein various kinds of programs and data; the keyboard 306 and the mouse 307 are input devices through which an operator performs various kinds of input operations and selection operations.

The USB port 31 is a connector (USB connector, female) formed in line with the Universal Serial Bus regulations, to which USB port 31 the USB connectors of a variety of kinds of USB equipment formed in line with the USB regulations can be connected. The USB connector 17 of the USB memory 1a can be inserted into/connected to the USB port 31 in such a manner that it can be attached and removed at will.

The USB controller 308 controls communication with the USB equipment (USB memory 1a) connected through the USB port 31.

Referring to the flowchart (step A10 through A50) a description will be made hereinbelow of processing relating to uncapping of the cap 20a in the USB memory 1a according to the first embodiment of the present invention with the above described construction.

In the USB memory 1a, when a user disengages the cap 20a from the USB connector 17, the cap detection switch 109 (switch 16) detects this (detecting step), and the main body unit 10a of the USB memory 1a is turned on, and initialization processing for each unit in the main body unit 10a is performed (step A10).

Further, when the cap detection switch 109 detects an uncapped state of the cap 20a, in which the cap 20a is uncapped from the USB connector 17 (see YES route of step A20), the timer 105 (first timer 13) measures (countdowns) a time duration that elapses under the uncapped state of the cap 20a (first measuring step; step A30).

Then, the timer 105 evaluates if the first predetermined time duration having been set beforehand elapses, that is, whether or not the time is out (step A40). If the first predetermined time duration has not yet elapsed (see NO route of step A40), the processing returns to step A20. Contrarily, if the first predetermined time duration elapses (see YES route of step A40), the timer 105 outputs a first predetermined time duration detection signal to the buzzer circuit 108 (alerting unit 15), which then outputs a predetermined alarming sound, thereby alerting the user (first alerting step; step A50), and ends the processing.

Further, when it is detected by the cap detection switch 109 that the cap 20a is engaged with the USB connector 17 (an engagement state) (see NO route of step A20), the processing ends.

Figure 5:
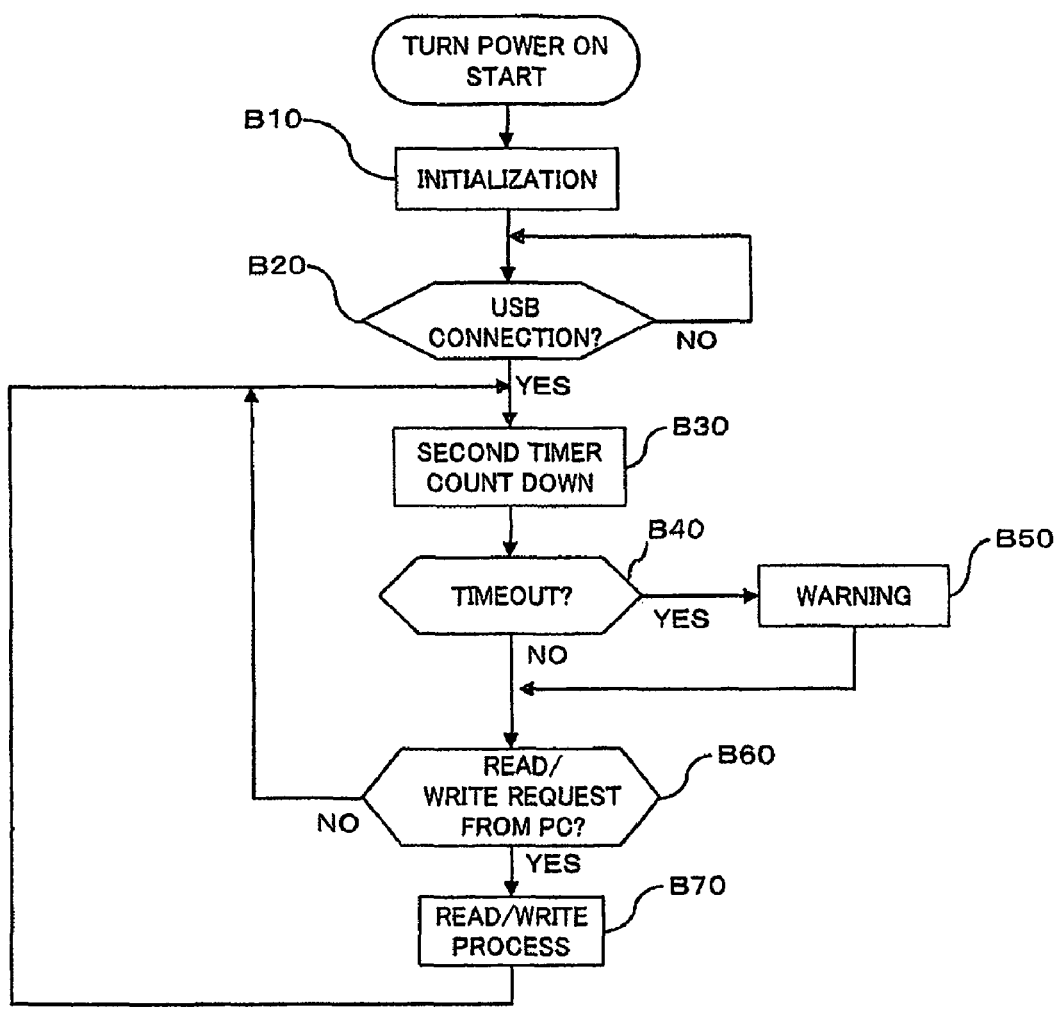
FIG. 5 is a flowchart for describing processing for connecting of the USB memory to the PC according to the first embodiment of the present invention.

Next, referring to the flowchart (step B10 through B70) shown in FIG. 5, a description will be made of the processing relating to connection of the USB memory 1a with the PC 30a according to the first embodiment of the present invention.

In the USB memory 1a, when a user uncaps the cap 20a from the USB connector 17, the cap detection switch 109 detects this, and the main body unit 10a of the USB memory 1a is turned on, and initialization processing for each unit in the main body unit 10a is performed (step B10).

Then, when the USB interface 106 (connection detector 12) detects that the main body unit 10a is connected (USB connection) to the USB port 31 of the PC 30a through the USB connector 17 (see YES route of step B20), the timer 105 (second timer 14) measures (countdowns) a time duration that elapses under a state in which the USB connector 17 is connected to the PC 30a (second measuring step; step B30).

The timer 105 (second timer 14) evaluates if the second predetermined time duration having been set beforehand elapses, that is, whether or not the time is out (step B40). If the second predetermined time duration has not yet elapsed (see NO route of step B40), an access request to the flash memory 110 (storage unit 11) such as data reading, data writing, and data deleting, is waited for (step B60).

If any access request is sent from the PC 30a (see YES route of step B60), the flash memory interface 107 performs the processing of data reading or the like to the flash memory 110 in obedience to the request (step B70), and the processing returns to step B30.

Further, if the second predetermined time duration elapses (see YES route of step B40), the timer 105 outputs a second predetermined time duration detection signal to the buzzer circuit 108 (alerting unit 15). Upon reception of the second predetermined time duration detection signal, the timer 105 outputs a predetermined alarming sound to the buzzer circuit 108 (alerting unit 15), and the buzzer circuit 108, which received the second predetermined time duration detection signal, outputs a predetermined alarming sound, thereby alerting the user (second alerting step; step B50), and the processing shifts to step B60.

Still further, in a case where no access request from the PC 30a is present (see NO route of step B60), the processing returns to step B30.

In this manner, with the USB memory 1a according to the first embodiment of the present invention, since the alerting unit 15 gives an alert to the user of the USB memory 1a upon elapse of the first predetermined time duration from uncapping of the cap 20a from the USB connector 17, it is possible to make the user of the USB memory 1a recognize that the USB memory 1a is being in use. As a result, for example, it is possible to prevent the USB memory 1a from being left in a state in which the USB memory 1a is inserted to the PC 30a, so that an occurrence of leaving the USB memory 1a behind can be prevented.

Further, since the alerting unit 15 gives an alert to the user of the USB memory 1a upon elapse of the second predetermined time duration under a state in which the USB memory 1a is connected to the PC 30a through the USB connector 17 and the USB port 31, it is possible to make the user of the USB memory 1a recognize that the USB memory 1a is being in use. As a result, it is possible to prevent the USB memory 1a from being left in a state in which the USB memory 1a is inserted to the PC 30a, so that an occurrence of leaving the USB memory 1a behind can be prevented.

Still further, since the alerting unit 15 gives an alert to the user of the USB memory 1a also when it is detected that the remaining battery amount in the battery 19 is not larger than a predetermined amount, it is possible for the user to acknowledge that the remaining battery amount in the battery 19 is small, so that he/she can charge the USB memory 1a. As a result, such a sate can be prevented from occurring as that in which each of the units of the main body unit 10a is incapable of executing the function thereof due to shortage of the remaining battery amount in the battery 19 of the USB memory 1a. This improves the reliability of the USB memory 1a.

Yet further, since the battery 19 automatically charges with USB bus power during the time in which the USB memory 1a is being connected to the PC 30a through the USB connector 17 and the USB port 31, it is possible to resolve the problem of the shortage of the remaining battery amount in the battery 19. This not only improves the reliability of the USB memory 1a but also improves the convenience thereof.

(B) First Modified Example of First Embodiment

Figure 6:
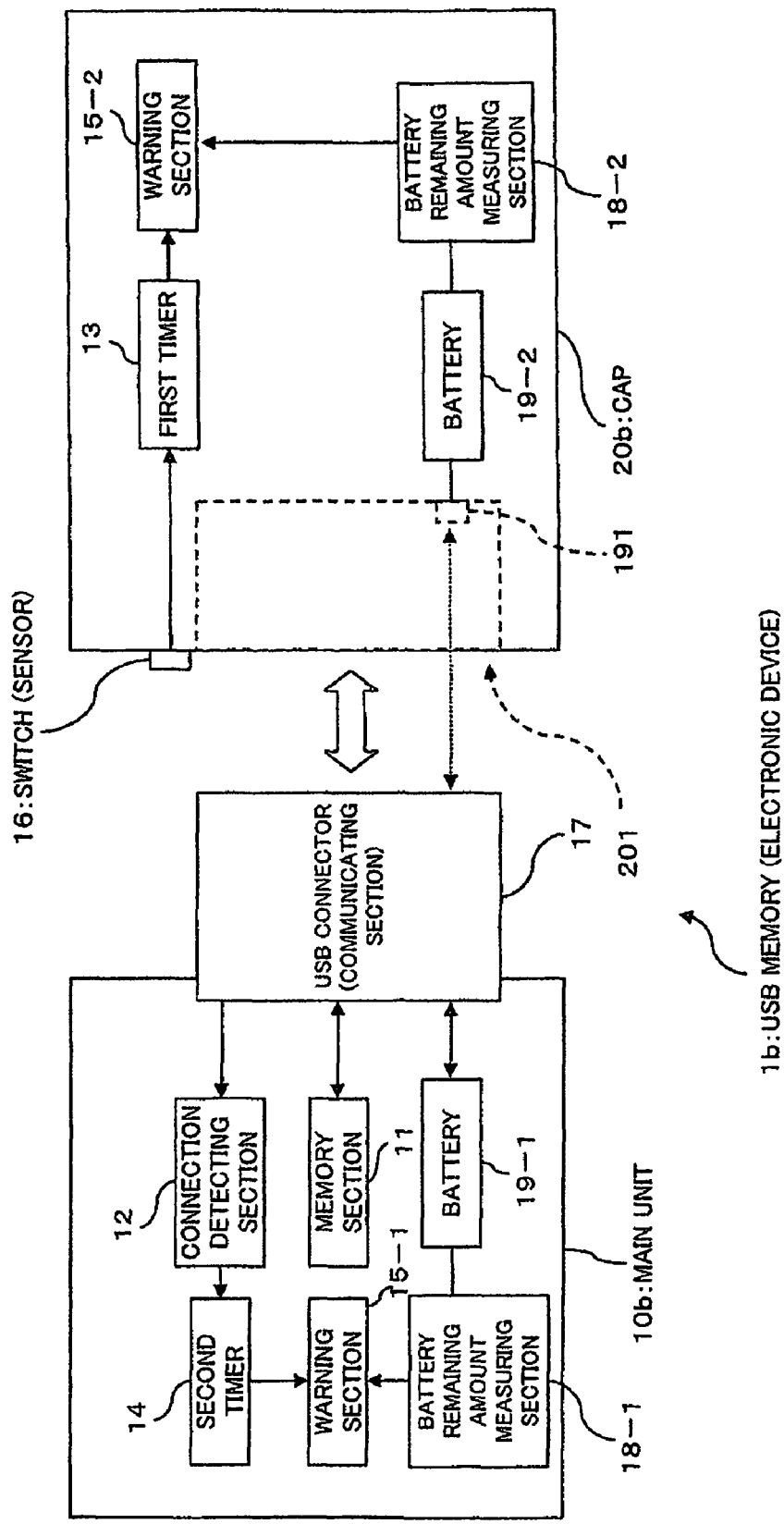
FIG. 6 is a diagram schematically showing a first modified example of the functional construction of the USB memory according to the first embodiment of the present invention.

FIG. 6 is a diagram schematically showing a first modified example of the functional construction of the USB memory 1b according to a first modified example of the first embodiment of the present invention.

Similar to the USB memory 1a of the first embodiment, the USB memory (electronic apparatus) 1b is connected to the PC 30a (see FIG. 3) in a communicable manner therebetween by means of inserting/connecting the USB connector 17 to the PC 30a. This PC 30a accesses the storage unit 11 to perform data reading, data writing, and data deleting. As shown in FIG. 6, the USB memory 1b includes: a main body unit 10b having a USB connector (communication unit, connection terminal) 17 and a storage unit 11; and a cap (component) 20b which is formed in such a manner that it is removable from the USB connector 17 (main body unit 10a).

Further, as shown in FIG. 6, the USB memory 1b has (i) the main body unit 10b which includes: a storage unit 11; a connection detector 12; a second timer 14; an alerting unit 15-1; a USB connector 17; a battery measuring unit 18-1; and a battery 19-1, and (ii) a cap 20b which includes a switch (sensor) 16; a first timer 13; an alerting unit 15-2; a battery 19-2; and a battery measuring unit 18-2.

Here, in the figure, since the reference characters that are the same as those which are already described indicate the same or approximately the same parts, their detailed descriptions will be omitted.

Further, the hardware construction of the main body unit 10b is the same as that of the main body unit 10a of the USB memory 1a according to the first embodiment except that the cap detection switch 109 in FIG. 2 is provided for the cap 20b. Still further, the cap 20b includes: a timer 105; a power circuit 112; and a charge circuit 113; a battery 19; and a buzzer circuit 108 as well as the cap detection switch 109 shown in FIG. 2.

The alerting units 15-1 and 15-2, each of which has the same or approximately the same construction as that of the alerting unit 15 in the USB memory 1a according to the first embodiment, is realized by the buzzer circuit 108. Further, similar to the alerting unit 15 of USB memory 1a according to the first embodiment, the alerting unit 15-1 provided for the main body unit 10b gives an alert when it receives a second predetermined time duration detection signal from the second timer 14 or when it receives a remaining amount detection signal from the battery measuring unit 18-1.

On the other hand, similar to the alerting unit 15 of the USB memory 1a according to the first embodiment, the alerting unit 15-2 provided for the cap 20b gives an alert when it receives a first predetermined time duration detection signal from the first timer 13.

The battery measuring units 18-1 and 18-2, each of which has the same or approximately the same construction as that of the battery measuring unit 18 in the USB memory 1a according to the first embodiment, is realized by the power circuit 112. The battery measuring unit 18-1 measures the remaining battery mount of the battery 19-1. When detecting that the remaining battery amount is not larger than a predetermined amount, the battery measuring unit 18 outputs a remaining amount detection signal to the alerting unit 15-1. Further, the battery measuring unit 18-2 measures the remaining mount of battery of the battery 19-2. When detecting that the remaining battery amount is not larger than a predetermined amount, the battery measuring unit 18-2 outputs a remaining amount detection signal.

The batteries 19-1 and 19-2, each of which has the same or approximately the same construction as that of the battery 19 in the USB memory 1a according to the first embodiment, supplies electricity to each of the units provided for the main body unit 10b. The battery 19-2 supplies electricity to each of the units provided for the cap 20b.

Further, in the USB memory 1b according to the first modified example, the engagement opening 201 to the USB connector 17 is provided with a battery 19-2 and a power circuit 112 in the cap 20b and the electrode 191 electrically coupled to the charge circuit 113. The power circuit 112, the charge circuit 113, and the battery 19-1 are coupled to the power circuit 112, the charge circuit 113, and the battery 19-2 provided for the cap 20b through the electrode 191 by means of mounting the cap 20b to the USB connector 17 of the main body unit 10b.

That is, the USB memory 1b according to the first modified example has a construction in which the cap 20b and the battery 19-1 provided for the main body unit 10b are electrically connectable under a state where the cap 20b is engaged with the USB connector 17.

Then, when the power circuit 112 of the main body unit 10b is coupled to the power circuit 112 and the charge circuit 113 which are provided for the cap 20b through the electrode 191 by means of engaging the cap 20b with the main body unit 10b (USB connector 17), the battery 19-1 of the main body unit 10b supplies electric current to the charge circuit 113 of the cap 20b through the electrode 191. With such current supplied from the battery 19-1 of the main body unit 10b, the charge circuit 113 charges the battery 19-2 provided for the cap.

That is, in the USB memory 1b according to the first modified example, the battery 19-2 provided for the cap 20b charges with electricity supplied from the battery 19-1 provided for the main body unit 10b under a state where the cap 20b is being engaged with the USB connector 17.

In the above described USB memory 1b according to the first modified example of the first embodiment, the cap 20b is uncapped from the USB connector 17 of the main body unit 10b, and the USB connector 17 is inserted/connected to the USB port 31, thereby realizing data reading, data writing, data deleting or the like between the storage unit 11 and the PC 30a.

In this instance, at that time, the battery 19-1 of the main body unit 10b charges with electricity supplied by USB bus power through the USB connector 17.

Further, when the switch (sensor) 16 of the cap 20b detects that the cap 20b is disengaged from the USB connector 17 (falls in an disengaging state thereof) (detecting step), a signal (discharging state detection signal) is outputted to the first timer 13, which signal informs the first timer 13 as such.

After that, upon reception of the discharging state detection signal from the switch 16, the first timer 13 starts measuring (countdown) (first measuring step). Upon elapse of a predetermined time duration (first predetermined time duration) having been set beforehand, the first timer 13 outputs a signal (first predetermined time duration detection signal) to the alerting unit 15-2, which signal informs the alerting unit 15-2 as such. At that time, the alerting unit 15-2 which received the predetermined detection signal performs alerting with an alarming sound at a predetermined frequency (first alerting step).

Further, the battery measuring unit 18-2 measures the remaining mount of battery (remaining battery amount) of the battery 19-2. When detecting that the remaining battery amount is not larger than a predetermined amount, the battery measuring unit 18-2 outputs to the alerting unit 15-2 a remaining amount detection signal, and the alerting unit 15-2 gives an alert informing that the remaining battery amount is small.

On the other hand, in the main body unit 10b, when detecting that the main body unit 10b is connected to the PC 30a through the USB connector 17, the connection detector 12 outputs to the second timer 14 a signal (connection detection signal) informing as such.

Upon reception of the connection detection signal from the connection detector 12, the second timer 14 starts measuring (countdown) (first measuring step). Upon elapse of a predetermined time duration (first predetermined time duration) having been set beforehand, the second timer 14 outputs a signal (second predetermined time duration detection signal) to the alerting unit 15-1, which signal informs the alerting unit 15-2 as such. At that time, upon reception of the second predetermined time duration detection signal, the alerting unit 15-1 gives an alert by means of generating an alarming sound at a predetermined frequency (second alerting step).

Further, the battery measuring unit 18-1 measures the remaining amount of battery (remaining battery amount) of the battery 19-1. When detecting that the remaining battery amount is not larger than a predetermined amount, the battery measuring unit 18-1 outputs to the alerting unit 15-1 a remaining amount detection signal, and the alerting unit 15-1 gives an alert informing that the remaining battery amount is small.

When a user engages the cap 20b to the USB connector 17 of the main body unit 10b, the battery 19-2 provided for the cap 20b charges with electricity supplied from the battery 19-1 of the main body unit 10b.

In this manner, with the USB memory 1b according to the first modified example of the first embodiment of the present invention, the effects and benefits similar to those of the above described first embodiment are realized. In addition, since the battery 19-2 provided for the cap 20b charges with electricity supplied from the battery 19-1 provided for the cap 20b under a state where the cap 20b is engaged with the USB connector 17, it is possible to charge also the battery 19-2 provided for the cap 20b, so that improved convenience is realized.

(C) Second Modified Example of First Embodiment

Figure 7:
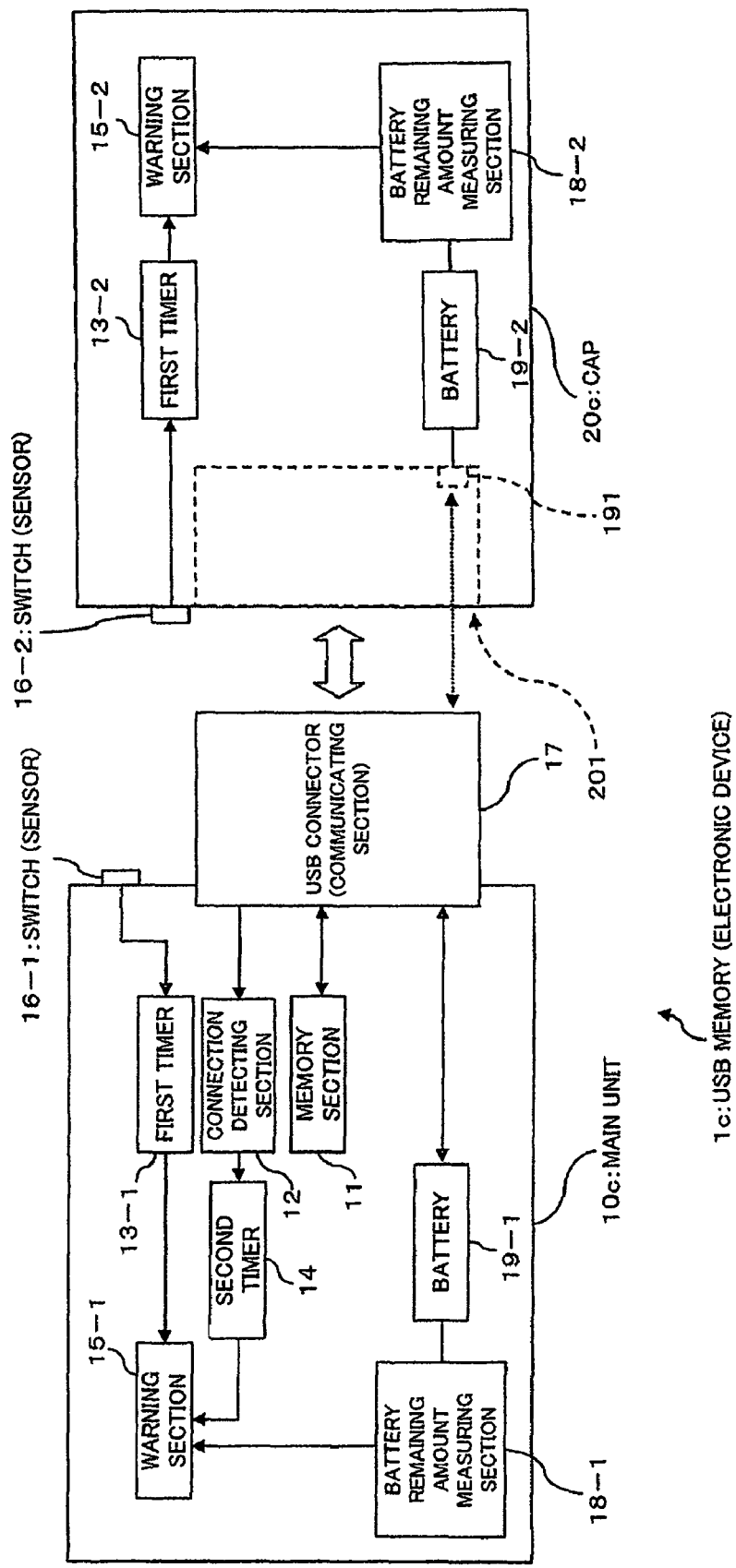
FIG. 7 is a diagram schematically showing a second modified example of the functional construction of the USB memory according to a second modified example of the first embodiment of the present invention.

FIG. 7 is a diagram schematically showing a second modified example of the functional construction of the USB memory 1c according to a second modified example of the first embodiment of the present invention.

Similar to the USB memory 1a of the first embodiment, the USB memory (electronic apparatus) 1c is connected to the PC 30a (see FIG. 3) in a communicable manner therebetween by means of inserting/connecting the USB connector 17 to the PC 30a. This PC 30a accesses the storage unit 11 to perform data reading, data writing, and data deleting. As shown in FIG. 7, the USB memory 1b includes: a main body unit 10c which has the similar construction to that of the main body unit 10a of the USB memory 1a according to the first embodiment; and a cap (component) 20c which has the similar construction to that of the cap 20b according to the first modified example of the first embodiment, and is formed in such a manner that it is removable from the USB connector 17.

Here, in the figure, since the reference characters that are the same as those which are already described indicate the same or approximately the same parts, their detailed descriptions will be omitted.

The switches 16-1 and 16-2, each of which detects an uncapped state of the cap 20c from the USB connector 17, have the same or the approximately the construction as that of the switch 16 according to the first embodiment, and is realized by the cap detection switch 109.

The first timer 13-1 measures a time duration that elapses under a state in which the cap 20c is uncapped, from when the switch 16-1 detects that the cap 20c is disengaged. The first timer 13-2 measures a time duration that elapses under a state in which the cap 20c is uncapped, from when the switch 16-2 detects that the cap 20c is uncapped.

Further, these first timers 13-1 and 13-2 each have the same or approximately the same construction as that of the first timer 13 according to the first embodiment.

In the USB memory 1c according to the second modified example of the first embodiment, the cap 20c is uncapped from the USB connector 17 of the main body unit 10c, and the USB connector 17 is inserted/connected to the USB port 31, thereby realizing data reading, data writing, data deleting or the like between the storage unit 11 and the PC 30a.

In this instance, at that time, the battery 19-1 of the main body unit 10c charges with electricity supplied by USB bus power through the USB connector 17.

Further, when the switch (sensor) 16-2 of the cap 20c detects that the cap 20c is uncapped from the USB connector 17 (falls in an uncapped state thereof) (detecting step), a signal (discharging state detection signal) is outputted to the first timer 13-2, which signal informs the first timer 13 as such.

After that, upon reception of the discharging state detection signal from the switch 16-2, the first timer 13-2 starts measuring (countdown) (first measuring step). Upon elapse of a predetermined time duration (first predetermined time duration) having been set beforehand, the first timer 13-2 outputs a signal (first predetermined time duration detection signal) to the alerting unit 15-2, which signal informs the alerting unit 15-2 as such. At that time, upon reception of the predetermined time duration detecting signal, the alerting unit 15-2 gives an alert by means of generating an alarming sound at a predetermined frequency (first alerting step).

Further, the battery measuring unit 18-2 measures the remaining amount of battery (remaining battery amount) of the battery 19-2. When detecting that the remaining battery amount is not larger than a predetermined amount, the battery measuring unit 18-2 outputs a remaining amount detection signal to the alerting unit 15-2, and the alerting unit 15-2 gives an alert informing that the remaining battery amount is small.

On the other hand, in the main body unit 10c, also, when the switch (sensor) 16-1 detects that the cap 20c is disengaged from the USB connector 17 (falls in an uncapped state) (detecting step), a signal (uncapped state detection signal) is outputted to the first timer 13-1 informing as such.

Upon reception of the uncapped state detection signal from the connection detector 12, the first timer 13-1 starts measuring (countdown) (first measuring step). Upon elapse of a predetermined time duration (first predetermined time duration) having been set beforehand, the first timer 13-1 outputs a signal (first predetermined time duration detection signal) to the alerting unit 15-1, which signal informs the alerting unit 15-1 as such. At that time, upon reception of the predetermined time duration detection signal, the alerting unit 15-1 gives an alert by means of generating an alarming sound at a predetermined frequency (first alerting step).

Further, upon detection that the main body unit 10c is connected to the PC 30a through the USB connector 17, the main body unit 10c outputs a signal (connection detection signal) informing as such to the second timer 14. Then, upon elapse of a predetermined time (a second predetermined time duration) having been set beforehand, the second timer 14 outputs a signal (second predetermined time duration detection signal) informing as such to the alerting unit 15-1. At that time, upon reception of the predetermined time duration detecting signal, the alerting unit 15-1 gives an alert by means of generating an alarming sound at a predetermined frequency (second alerting step).

Further, the battery measuring unit 18-1 measures the remaining amount of battery (remaining battery amount) of the battery 19-1. When detecting that the remaining battery amount is not larger than a predetermined amount, the battery measuring unit 18-1 outputs a remaining amount detection signal to the alerting unit 15-1, and the alerting unit 15-1 gives an alert informing that the remaining battery amount is small.

When a user engages the cap 20c to the USB connector 17 of the main body unit 10c, the battery 19-2 provided for the cap 20c charges with electricity supplied from the battery 19-1 of the main body unit 10c.

In this manner, with the USB memory 1c according to the second modified example of the first embodiment of the present invention, the effects and benefits similar to those of the above described first embodiment and the first modified example of the first embodiment are realized. In addition, since the alerting unit 15-2 is provided also for the cap 20c, which alerting unit 15-2 also gives an alert, it is possible for a user to receive such an alert more assuredly, so that the reliability can be improved.

(D) Second Embodiment

Figure 8:
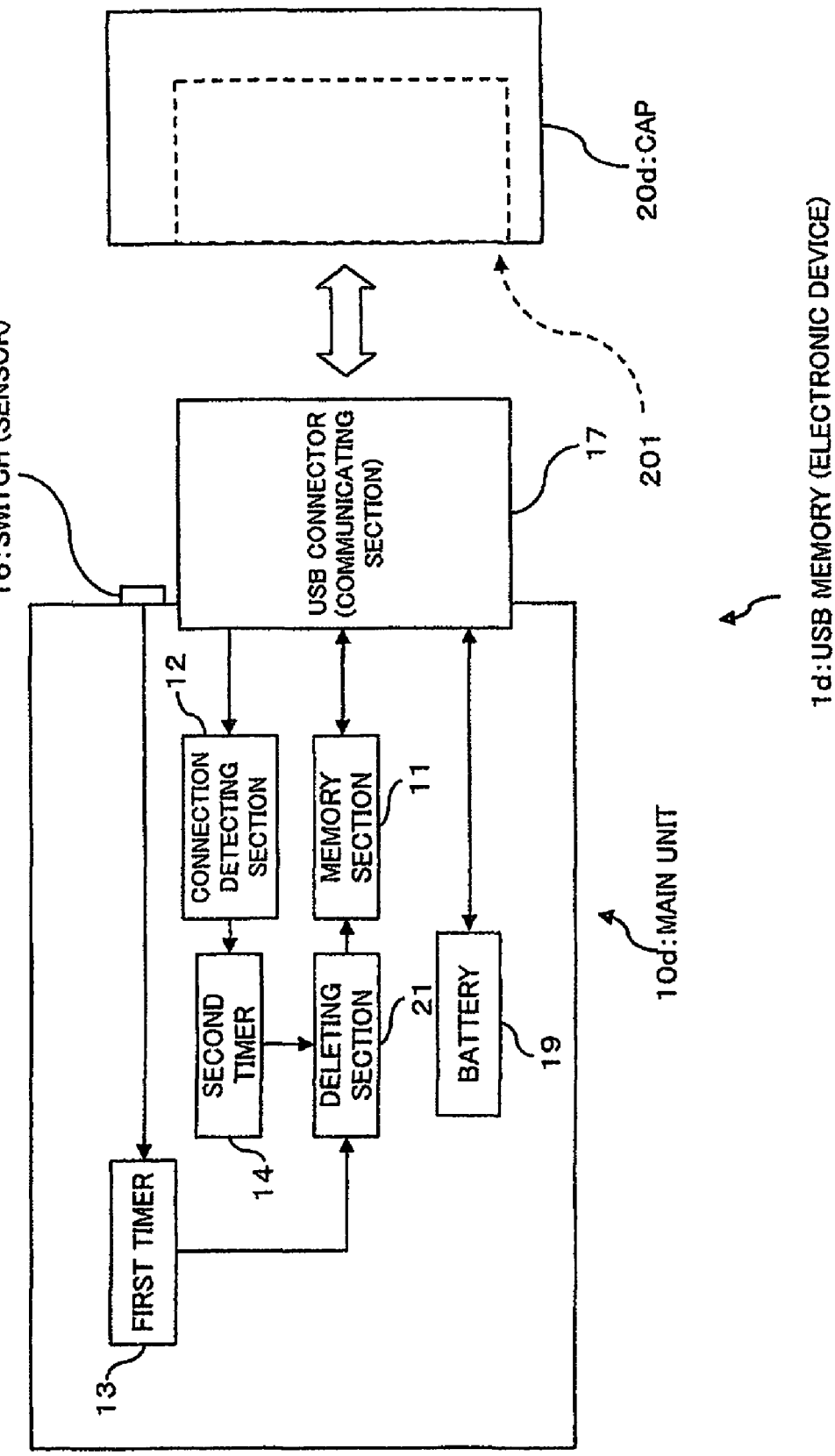
FIG. 8 is a diagram schematically showing a functional construction of a USB memory (Universal Serial Bus) according to a second embodiment of the present invention.

FIG. 8 is a diagram schematically showing a functional construction of a USB (Universal Serial Bus) memory according to a second embodiment of the present invention.

Similar to the USB memory 1a of the second embodiment, the USB memory (electronic apparatus) 1d is connected to the PC 30a (see FIG. 3) in a communicable manner therebetween by means of inserting/connecting the USB connector (communication unit, connection terminal) 17 to the PC 30a. This PC 30a accesses the storage unit 11 to perform data reading, data writing, and data deleting. As shown in FIG. 8, the USB memory 1d has the same construction as that of the USB memory 1a of the first embodiment, including: a main body unit 10d having a USB connector 17 and a storage unit 11; and a cap (component) 20d which is formed in such a manner that it is removable from the USB connector 17.

As shown in FIG. 8, the USB memory 1d according to the second embodiment has a deleting unit 21 in place of the alerting unit 15 and the battery measuring unit 18 of the USB memory 1a according to the first embodiment. The other parts of the USB memory 1d are the same as those of the USB memory 1a according to the first embodiment.

The deleting unit 21 deletes (removes) data stored in the storage unit 11. Upon detection of elapse of a third predetermined time duration (first predetermined time duration) by the first timer 13, the deleting unit 21 deletes data stored in the storage unit 11.

Further, the deleting unit 21 deletes (removes) data stored in the storage unit 11 also when the second timer 14 detects that a fourth predetermined time duration (the second predetermined time duration) elapses.

In this instance, the deleting unit 21 is realized by, for example, the flash memory interface 107 shown in FIG. 2. Further, the deleting unit 21 may delete all the data stored in the flash memory 110 (storage unit 11), or may delete only specific data. As to making the deleting unit 21 delete specific data, it can be realized by means of giving settings (flags), which indicate whether subject data is to be deleted or not to be deleted, to the data, or by means of giving setting which inhibits data, whose deletion is not expected, from being deleted by use of a data protection function that an OS (Operating System) or the like of a computer has.

The battery 19 automatically charges with electricity supplied from the PC 30a through the USB connector 17 and/or the USB port 31 under a state in which the USB memory 1d (main body unit 10d) is being connected to the PC30a.

Figure 9:
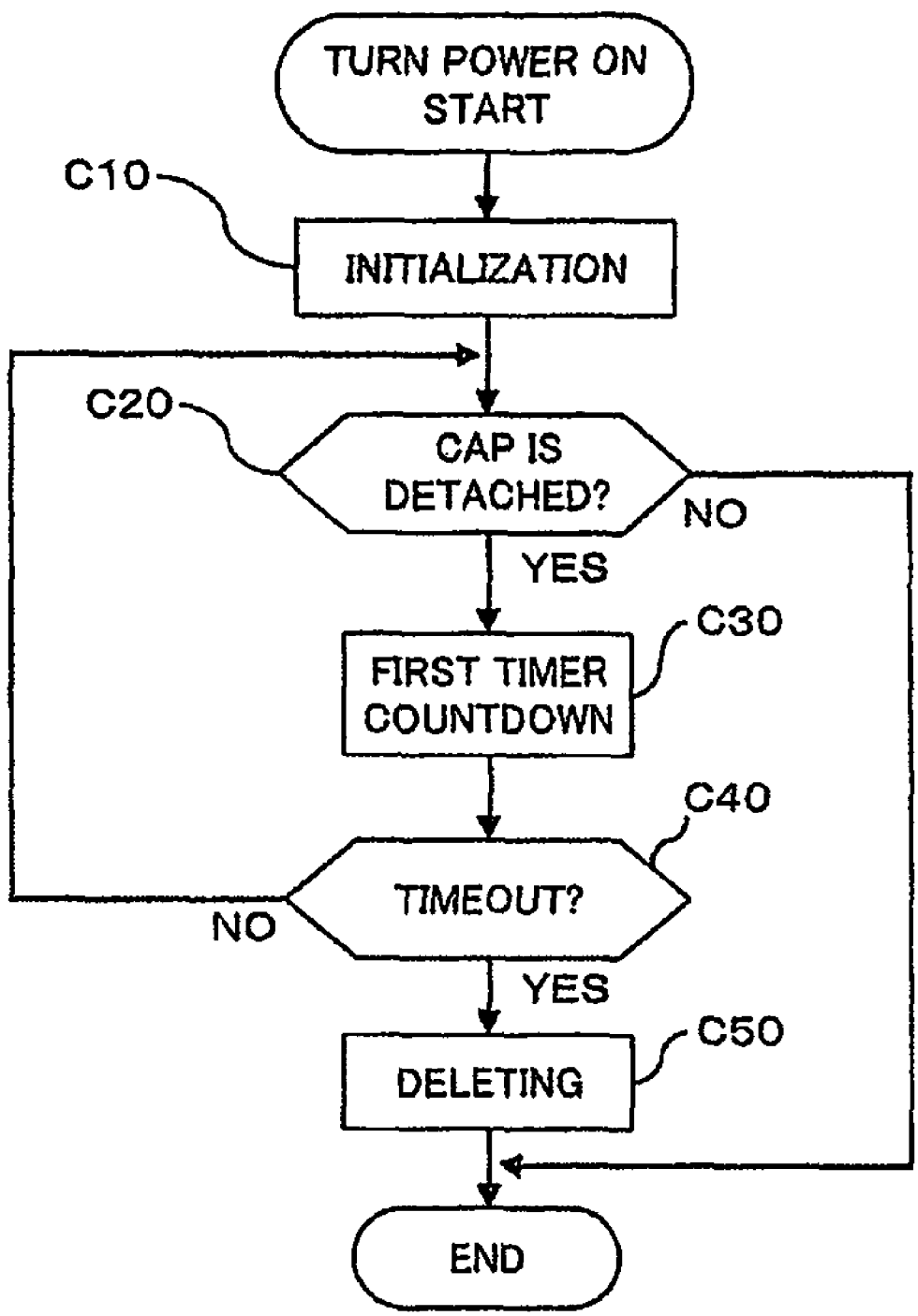
FIG. 9 is a flowchart for describing processing for uncapping the cap of the USB memory according to the second embodiment of the present invention.

Hereinafter, referring to the flowchart (step C10 through C50) in FIG. 9, a description will be made of the processing relating to uncapping of the cap 20d in the USB memory 1d according to the second embodiment of the present invention with the construction described above.

In the USB memory 1d, when a user uncaps the cap 20d from the USB connector 17, the cap detection switch 109 (switch 16) detects this (detecting step), and the main body unit 10d of the USB memory 1d is turned on, and initialization processing to each of the units in the main body unit 10d is performed (step C10).

Then, when the cap detection switch 109 detects the state in which the cap 20d is uncapped (see YES route of step C20), the timer 105 measures (countdowns) a time duration that elapses at the state in which the cap 20d is being uncapped (first measuring step; step C30).

After that, the timer 105 (first timer 13) evaluates whether or not a third predetermined time duration having been set beforehand elapses, that is, if the time is out (step C40). If the third predetermined time duration has not yet elapsed (see NO route of step C40), the processing returns back to step C20, Contrarily, if the third predetermined time duration elapses (see YES route of step C40), the timer 105 outputs a third predetermined time detection signal to the flash memory interface 107 (deleting unit 21). The flash memory interface 107 deletes the data stored in the flash memory 110 (storage unit 11) (first deleting step; step C50), and then ends the processing.

Further, when the cap detection switch 109 detects that the cap 20d is engaged with the USB connector 17 (engaged stated) (see NO route of step C20), the processing ends.

Figure 10:
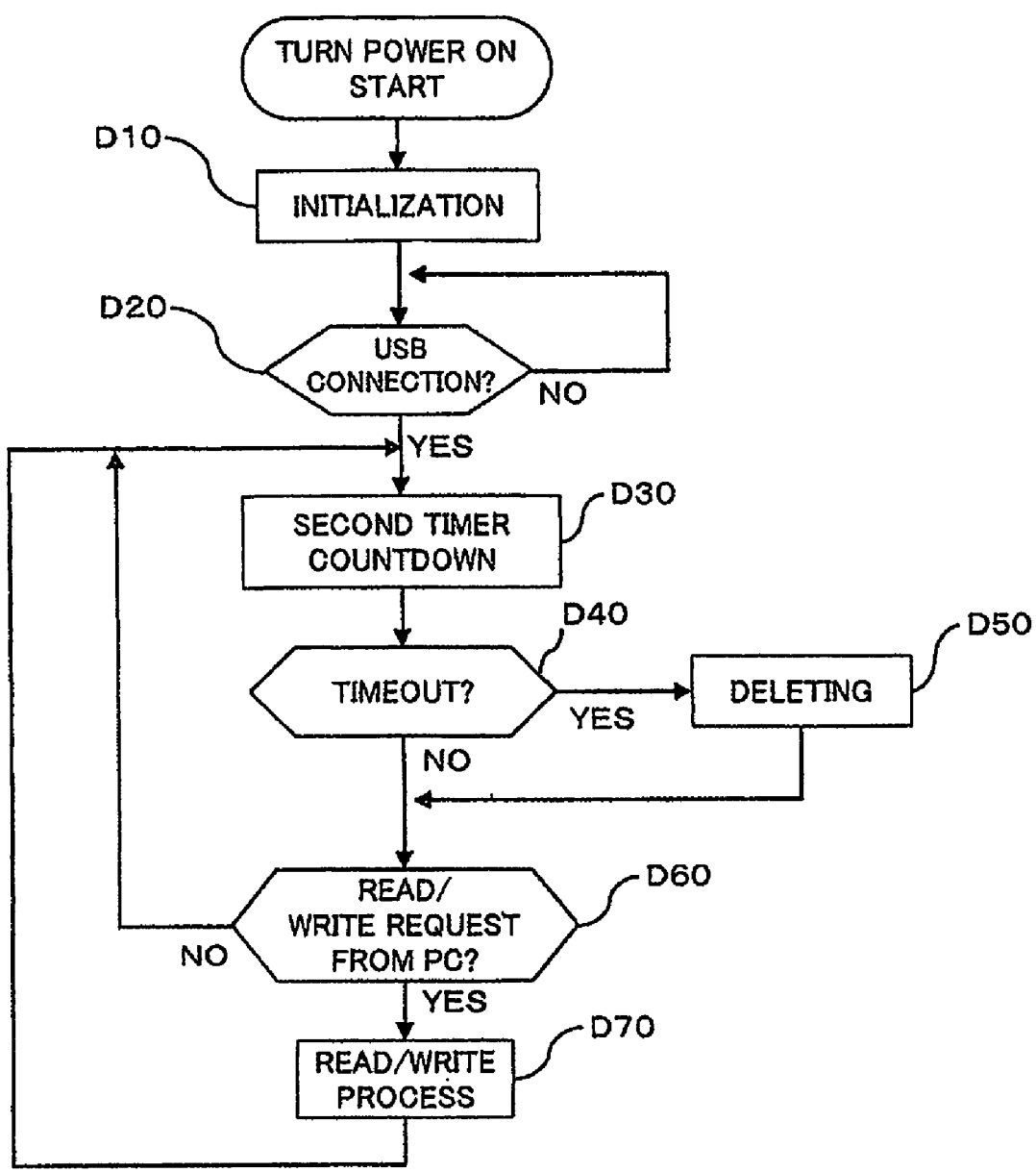
FIG. 10 is a flowchart for describing processing for coupling of the USB memory to the PC according to the second embodiment of the present invention.

Next, referring to the flowchart (step D10 through D70) in FIG. 10, a description will be made of the processing relating to connection of the USB memory 1d to the PC 30a according to the second embodiment of the present invention.

In the USB memory 1d, when a user uncaps the cap 20d from the USB connector 17, the cap detection switch 109 detects this, and the main body unit 10d of the USB memory 1d is turned on, and initialization processing to each of the units in the main body unit 10d is performed (step D10).

Then, when the USB interface 106 (connection detector 12) detects that the main body unit 10d is connected (USB connection) to the USB port 31 of the PC 30a (see YES route of step D20), the timer 105 (second timer 14) measures (countdowns) a time duration that elapses at the state in which the USB connector 17 is being connected to the PC 30a (second measuring step; step D30).

The timer 105 (second timer 14) evaluates whether or not the time is out, that is, whether or not a fourth predetermined time duration having been set beforehand elapses, that is, if the time is out (step D40). If the fourth predetermined time duration has not yet elapsed (see NO route of step D40) an access request to the flash memory 110 (storage unit 11) such as data reading, data writing, and data deleting (step D60), is waited for.

When an access request is sent from the access request from the PC30a (see YES route of step D60), the flash memory interface 107 performs such processing such as data reading and data writing (step D70), and the processing returns back to step D30.

Contrarily, if the fourth predetermined time duration elapses (see YES route of step D40), the timer 105 outputs a fourth predetermined time detection signal to the flash memory interface 107 (deleting unit 21). The flash memory interface 107 deletes the data stored in the flash memory 110 (storage unit 11) (second deleting step; step D50), and then the processing shifts to step D60.

Still further, in a case of absence of any access request from the PC 30a (see NO route of step D60), the processing returns back to step D30.

In this manner, with the USB memory 1d according to the second embodiment of the present invention, upon elapse of the third predetermined time duration from when the cap 20d uncapped from the USB connector 17, the deleting unit 21 deletes the data stored in the storage unit 11. As a result, even when, for example, the USB memory 1d is left to be inserted to the PC 30a, a third person who obtains the USB memory 1d is incapable of using data stored in the storage unit 11, so that it is possible to improve the confidentiality of data, thereby preventing the leakage of confidential information.

Further, since the deleting unit 21 deletes the data stored in the storage unit 11 upon elapse of the fourth predetermined time duration from when the USB memory 1d is connected to the PC 30a through the USB connector 17 and the USB port 31. This also makes it possible to improve data confidentiality, thereby preventing the leakage of confidential information.

Still further, since the battery 19 automatically charges with USB bus power while the USB memory 1d is being connected to the PC 30a through the USB connector 17 and the USB port 31, it is possible to resolve the problem of the shortage of the remaining battery amount of the battery 19, so that high convenience is realized.

(E) Third Embodiment

Figure 11:
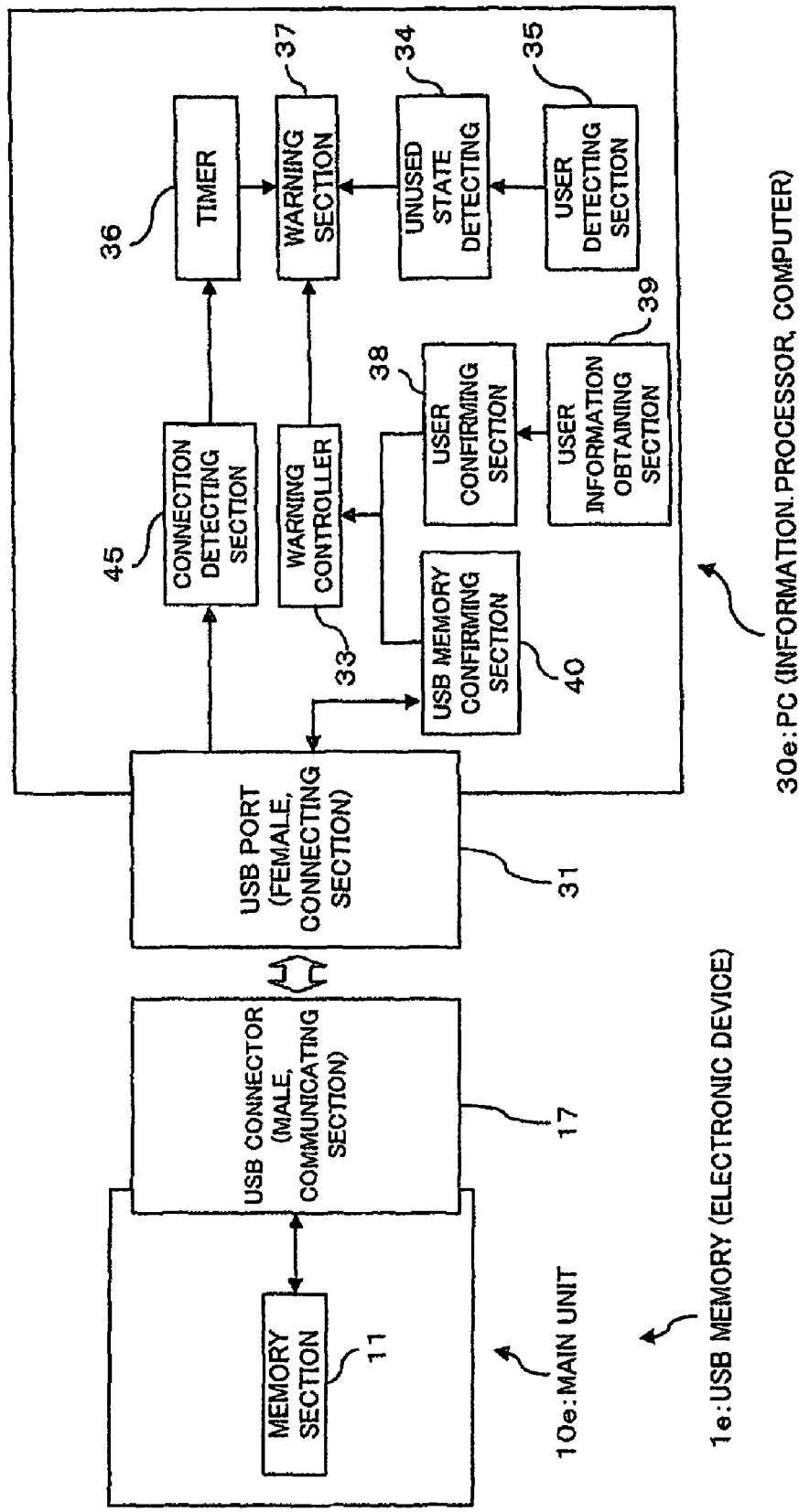
FIG. 11 is a diagram schematically showing functional constructions of a PC and a USB memory according to a third embodiment of the present invention.

FIG. 11 is a diagram schematically showing functional constructions of a PC (information processing apparatus, computer) 30e and a USB (Universal Serial Bus) memory 1e according to a third embodiment of the present invention.

Here, in the figure, since the reference characters the same as those which are already described indicate the same or approximately the same parts, their detailed descriptions will be omitted.

The PC 30e according to the third embodiment includes a USB port [USB connector (female); connector] 31 to which the USB memory (electronic apparatus) 1e is connected in a communicable manner therebetween. The PC 30e is connected to the USB memory 1e in a communicable manner therebetween by means of inserting/connecting the USB connector (communication unit, connection terminal) 17 of the USB memory 1e to this USB port 31. From this PC 30e, data reading, data writing, and data deleting are performed to the storage unit 11 of the USB memory 1e.

Further, similar to the PC 30a according to the first embodiment, the PC 30e according to the third embodiment has a hardware construction shown in FIG. 3, and thus, its detailed description will be omitted.

As shown in FIG. 11, the USB memory 1e includes: a main body unit 10e having a USB connector (communication unit, connection terminal) 17 and a storage unit 11; and a cap (component; not illustrated) which has the similar construction to that of the cap 20a in the first embodiment and is formed in such a manner that it is removable from the USB connector 17.

As shown in FIG. 11, the PC 30e includes: a USB port 31; a connection detector 45; an alert controller 33; a unused state detector 34; a user detector 35; a timer 36; an alerting unit 37; a user confirming unit 38; a user information obtaining unit 39; and a USB memory confirming unit 40.

The connection detector 45 detects that the USB memory 1e is connected to the USB port 31. For example, similar to the connection detector 12 of the USB memory 1a, the connection detector 45 is realized by a USB interface or the like. In this instance, detection of connection to the USB memory 1e performed by the connection detector 45 can also be realized by means of using a variety of kinds of already known methods.

Further, when detecting that the USB memory 1e is connected to the PC 30e, the connection detector 45 outputs a signal (connection detection signal) which informs the timer 36 as such.

The timer 36, which measures a time duration that elapses under a connection-established state, in which the USB memory 1e is connected to the PC 30e, from when the connection detector 45 detects that the USB memory 1e is connected to the PC 30e, is realized by the timer 105 (see FIG. 2) which is constructed as, for example, a counter, like the second timer 14 of the USB memory 1a according to the first embodiment.

Upon elapse of a predetermined time duration (second predetermined time duration) having been set beforehand, the timer 36 outputs a signal (second predetermined time duration detection signal) notifying the alerting unit 37 of the elapse of the predetermined time duration.

The user confirming unit 38 confirms that a person (user) who is using/operating the PC 30e is a specific authorized user of the PC 30e. In the third embodiment, on the basis of the information (user information) obtained by the user information obtaining unit 39, the user confirming unit 38 confirms that the user of the PC 30e is a specific authorized user of the PC 30e.

In this instance, such a specific authorized user of the PC 30e means a person who has any validity in use of the PC 30e, such as the owner of the PC 30e and people who are given a permission to use the PC 30e from the owner, and information relating to such specific authorized users (specific authorized user information; not illustrated) is registered beforehand in the HDD 305 or the like of the user information obtaining unit 30e of the PC 30e. That is, it can be said that a person whose specific authorized user information is registered beforehand is a specific authorized user.

The user information obtaining unit 39 for obtaining information relating to a user of the PC 30e, obtains information (for example, information relating to a password, a fingerprint picture image, a picture image of a user's face, a smart card, and a FeLica card) for use in confirming that the user of the PC 30e is an identified authorized user.

For example, when the user confirming unit 38 performs user confirmation by use of password authentication, an input apparatus such as the keyboard 306 used for inputting a password therethrough functions as a user information obtaining unit 39. In this case, the user confirming unit 38 makes a user input a password through the keyboard 306 or the like, and then admits the user of the PC 30e is a specific authorized user when the input password matches any of the registered passwords (specific authorized user information).

Further, when the user confirming unit 38 performs face authentication, a camera used in inputting a picture image of a user's face functions as the user information obtaining unit 39. In this case, the user confirming unit 38 takes a picture of a user's face or the like, and compares the obtained picture with data for authentication (image data or characteristic feature data, which has been registered beforehand; specific authorized user information) having been registered beforehand.

Still further, when the user confirming unit 38 performs fingerprint authentication, a fingerprint sensor used in inputting of a fingerprint functions as the user information obtaining unit 39. In this case, the user confirming unit 38 makes a user input his/her fingerprint, and compares the input fingerprint data with registered fingerprint data having been registered beforehand (specific authorized user information).

Yet further, when a card reader reads information of a smart card or a FeLica card carried by a user and user authentication is performed by comparing card registration information (specific authorized user information) having been registered beforehand, the card reader for use in reading the information contained in the card functions as the user information obtaining unit 39.

In this instance, a confirmation method used by the user confirming unit 38 for evaluating whether or not a user is a specific authorized user, should by no means be limited to the above described method, and various kinds of already known authentication can be employed. Equipment used for obtaining necessary information at such authentication is equivalent to the user information obtaining unit 39.

Then, when deciding that the user of the PC 30e is a specific authorized user of the PC 30e, the user confirming unit 38 outputs a signal (specific authorized user detection signal) indicating as such to the alert controller 33, which will be described later.

The USB memory confirming unit 40 evaluates whether or not the USB memory 1e connected to the PC 30e is related to a specific authorized user.

Here, the expression of "the USB memory 1e related to an authorized user" means that the USB memory 1e is the one which is used by a specific authorized user related to the PC 30e.

Confirmation performed by the USB memory confirming unit 40, that the USB memory 1e relates to a specific authorized user is executed in the following manner. First of all, the HDD 305 or the like of the PC 30e stores therein management information, indicating that a USB memory 1e is owned by a specific authorized user, as a management list, and the storage unit 11 of the USB memory 1e stores therein the same management information in the storage unit 11 of the USB memory 1e.

Then, when the USB memory 1e is engaged with the USB port 31 of the PC 30e, the USB memory confirming unit 40 reads management information stored in the storage unit 11 in the USB memory 1e, and confirms that the USB memory 1e is related to a specific authorized user by means of collating the read out management information with the management information of the management list registered in the PC 30e. That is, it can be said that the USB memory 1e whose management information has been registered in the PC 30e beforehand is the USB memory 1e relating to a specific authorized user.

Further, when confirming that the USB memory 1e connected to the USB memory 1e relates to a specific authorized user, the USB memory confirming unit 40 outputs a signal (USB memory confirmation signal) indicating as such to the alert controller 33.

The user detector 35 detects the presence of a user in the PC 30e, and is capable of detecting the presence of a user who operates the PC 30e by means of, for example, using various types of sensors.

Further, when detecting the presence of a user who operates the PC 30e, the user detector 35 outputs a signal (user detection signal) indicating as such to the unused state detector 34.

The unused state detector 34 detects the transition of the PC 30e into an unused state thereof by the user. When detecting that the PC 30e falls in a state with no user, the unused state detector 34 outputs a signal (unused state detection signal) indicating as such to the alert controller 33.

The unused state detector 34 detects the transition of the PC 30e to an unused state thereof when at least any one of the following states is detected: (1) a state in which power-off of the PC 30e is detected; (2) a state in which shift of the PC 30e into a power-saving operation mode is detected; (3) a state in which the presence of a user which was detected by the user detector 35 is not detected anymore.

In this instance, detection of power-off in the PC 30e and detection of the PC's shift to a power-saving operation mode can be realized by using various types of already known methods.

Further, the method in use of the unused state detector 34 for detecting transition of the PC 30e to the unused state thereof should by no means be limited to the above-described method, and a variety of kinds of modifications can be applied.

For example, the PC 30e may decide that the absence of a user when an input operation through the keyboard 306 and the mouse 307 is not consecutively performed. In this case, the CPU 301 of the PC 30e functions as the user detector 35.

The alerting unit 37, which alerts a user of the PC 30e, has the same or approximately the same construction as that of the alerting unit 15 according to the first embodiment. The alerting unit 37 is realized by, for example, a buzzer circuit.

This alerting unit 37 gives an alert when the timer 36 detects that a predetermined time duration (second predetermined time duration) elapsed. Concretely, the alerting unit 37 gives an alert upon reception of the second predetermined time duration.

In addition, the alerting unit 37 gives an alert when the unused state detector 34 detects transition of the PC 30e to an unused state thereof. Concretely, the alerting unit 37 gives an alert upon reception of an unused state detection signal from the unused state detector 34.

The alert controller 33 restrains an alert given by the alerting unit 37. In a case where a user of the PC 30e is a specific authorized user relating to the USB memory 1e, the alert controller 33 restrains the alerting unit 37 from giving an alert. More specifically, upon reception of a specific authorized user detection signal from the user confirming unit 38, the alert controller 33 restrains the alerting unit 37 from giving an alert even when the timer 36 detects that a predetermined time duration elapses.

Further, when the USB memory confirming unit 40 confirms that the USB memory confirming unit 40 confirms 1e connected to the PC 30e is the one which relates to a specific authorized user, that is, when the alert controller 33 receives a USB memory confirming signal from the USB memory confirming unit 40, the alert controller 33 restrains the alerting unit 37 from giving an alert even when the timer 36 detects that a predetermined time duration elapses.

In the PC 30e with the above described construction according to the third embodiment of the present invention, the storage unit 11 of the USB memory 1e of the USB memory 1e sets (stores) therein management information, and the management information is registered in a management list of the PC 30e.

Then, when the USB memory 1e is inserted into the USB port 31 of the PC 30e, the USB memory confirming unit 40 of the PC 30e accesses the storage unit 11 of the USB memory 1e through the USB port 31 and the USB connector 17 to obtain the management information therefrom, and then compares the obtained management information with a management list stored in the HDD 305 or the like, thereby evaluating whether or not the USB memory 1e connected to the PC 30e is the one which relates to a specific authorized user.

The USB memory confirming unit 40 outputs a USB memory confirmation signal to the alert controller 33 when the USB memory 1e connected to the PC 30e is the one which relates to a specific authorized user.

Further, the user confirming unit 38 confirms that a user is a specific authorized user relating to the PC 30e based on user information obtained by the user information obtaining unit 39. When deciding that a person (user) who is using/operating the PC 30e is a specific authorized user relating to the PC 30e, the user confirming unit outputs a specific authorized user detection signal to the alert controller 33.

When detecting that the USB memory 1e is connected to the USB port 31 (connection detecting step), the connection detector 45 outputs a signal (connection detection signal) informing as such to the timer 36, and the timer 36 measures a time duration that elapses under a connection-established state, in which the USB memory 1e is connected to the PC 30e, from when the connection detector 45 detects that the USB memory 1e is connected to the PC 30e (measuring step). Then, upon elapse of a predetermined time duration (a second predetermined time duration), which has been set beforehand, the timer 36 outputs a second predetermined time duration detection signal to the alerting unit 37.

Further, when detecting that the PC 30e falls in an unused state thereof based on the information from the user detector 35 or the like (unused state detecting step), the unused state detector 34 outputs an unused state detection signal to the alert controller 33.

After receiving the second predetermined time duration detection signal or the unused state detection signal, the alerting unit 37 gives an alert (alerting step), whereas the alert controller 33 performs control in such a manner that an alert given by the alerting unit 37 is restrained (alert controlling step) when this alert controller 33 receives a USB memory confirmation signal or a specific authorized user detection signal.

In such a manner, with the PC 30e according to the third embodiment of the present invention, the alerting unit 37 gives an alert when the second predetermined time duration elapses from when the USB memory 1e is connected to the PC 30e through the USB connector 17 and the USB port 31, or when the PC 30e falls in an unused state thereof. This arrangement makes it possible for a user of the USB memory 1e to recognize the USB memory 1e is being used, and also makes it possible to prevent the USB memory 1e from being left in a state in which the USB memory 1a is inserted to the PC 30e, so that an occurrence of leaving the USB memory 1e behind can be prevented.

In a case where the user confirming unit 38 decides that a user of the PC 30e is a specific authorized user relating to the USB memory 1e, and/or in a case where the USB memory confirming unit 40 decides that the USB memory 1e connected to the PC 30e is the one relating to a specific authorized user, the alert controller 33 restrains the alerting unit 37 from giving an alert. As a result, the alerting unit 37 never gives an alert even when the second predetermined time duration elapses from when the USB memory 1e is connected to the PC 30e through the USB connector 17 and the USB port 31, and even when the PC 30e falls in an unused state thereof, so that it can avoid a user from being annoyed by an alert, and thus, the convenience is resultantly improved.

Further, since the user information obtaining unit 39 obtains user information, it is possible for the user confirming unit 38 to confirm that a user is a specific authorized user relating to the PC 30e with ease and reliability.

(F) Fourth Embodiment

Figure 12:
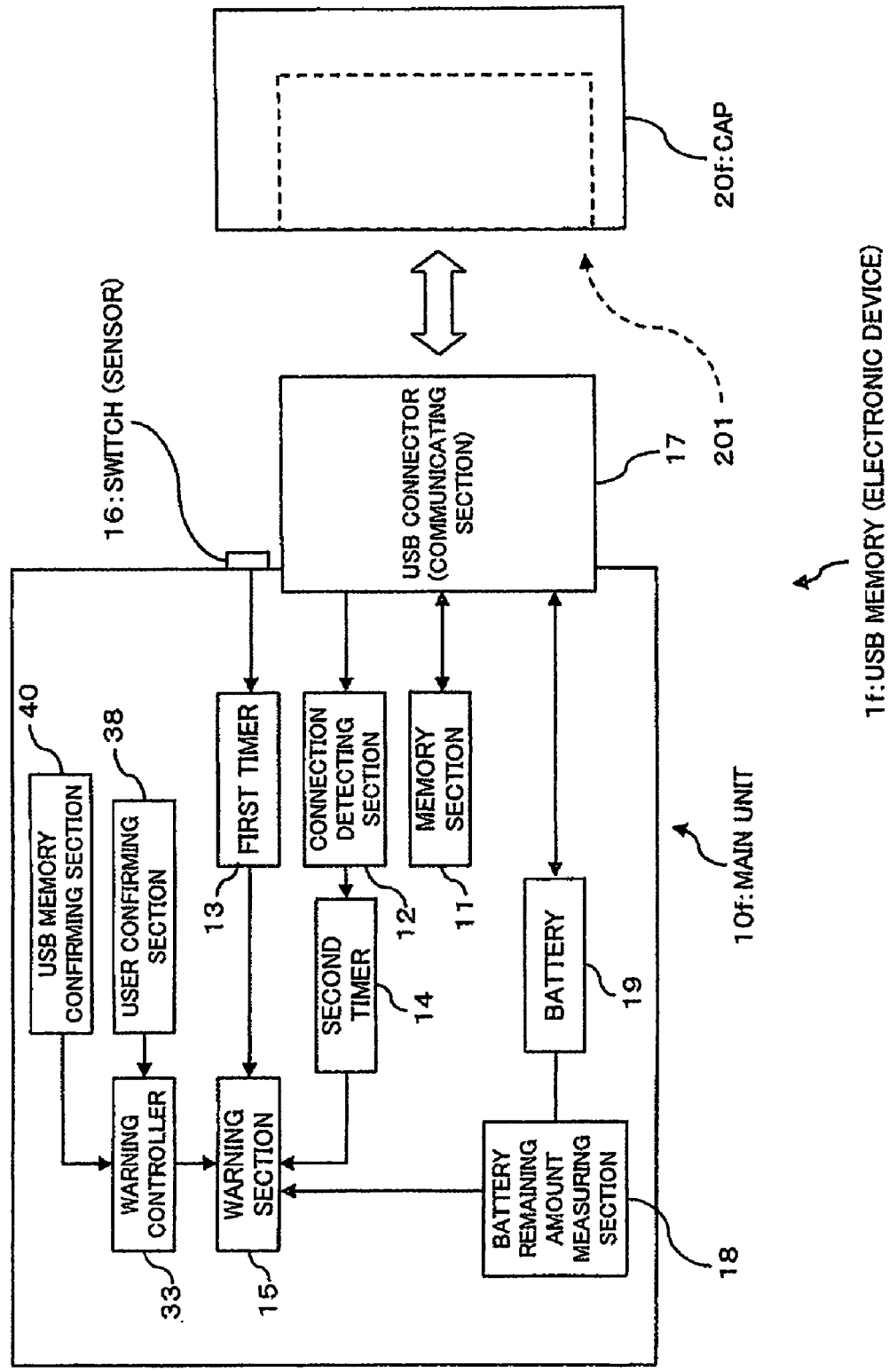
FIG. 12 is a diagram schematically showing a functional construction of a USB memory according to a fourth embodiment of the present invention.

FIG. 12 is a diagram schematically showing a functional construction of a USB (Universal Serial Bus) memory 1f according to a fourth embodiment of the present invention.

Similar to the USB memory 1a according to the first embodiment, the USB memory (electronic apparatus) 1f according to the fourth embodiment is inserted/connected to a USB port 31 of a PC 30a (see FIG. 3), the USB memory 1f being thereby connected to the PC 30a in a communicable manner therebetween, and data writing, data reading, and data deleting in the storage unit 11 are performed from the PC 30a. As shown in FIG. 12, the USB memory 1f includes: the main body unit 10f having the USB connector (communication unit, connection terminal) 17 and the storage unit 11; and a cap 20f having the similar construction to that of the cap 20a of the USB memory 1a according to the first embodiment, which cap 20f is constructed in such a manner that it can be uncapped from the USB connector 17.

As shown in FIG. 12, the USB memory (electronic apparatus) 1f according to the forth embodiment has a construction of the USB memory 1a according to the first embodiment with addition of the alert controller 33, the user confirming unit 38, and the USB memory confirming unit 40 thereto, and the other parts of the USB memory 1f have the constructions similar to those of the USB memory 1a according to the first embodiment.

Here, in the figure, since the reference characters that are the same as those which are already described indicate the same or approximately the same parts, their detailed descriptions will be omitted.

Similar to the above described USB memory 1a according to the first embodiment, in the USB memory 1f according to the fourth embodiment, the alerting unit 15 gives an alert to a user of the USB memory 1f when the first predetermined time duration elapses from when the cap 20f is uncapped from the USB connector 17 and also when the second predetermined time duration elapses from when the USB memory 1f is connected to the PC 30a through the USB connector 17 and the USB port 31.

Further, similar to the PC30e of the third embodiment, in the USB memory 1f according to the fourth embodiment, the user confirming unit 38 confirms that a user of the PC 30a is a specific authorized user related to the PC 30a, and the alert controller 33 restrains the alerting unit 35 from giving an alert in a case where the USB memory confirming unit 40 decides that the USB memory 1f connected to the PC 30a is the one which relates to a specific authorized user.

With this arrangement, as described above, the alerting unit 15 never gives an alert even when the second predetermined time duration elapses form when the USB memory 1f is connected to the PC 30a through the USB connector 17 and the USB port 31, and even when the PC 30a falls in an unused state thereof, so that it can prevent a user from being annoyed by an alert, and thus, the convenience is resultantly improved.

In this manner, with the USB memory 1f according to the fourth embodiment of the present invention, the effects and benefits realized by the above described first embodiment and third embodiments are realized.

(G) Fifth Embodiment

Figure 13:
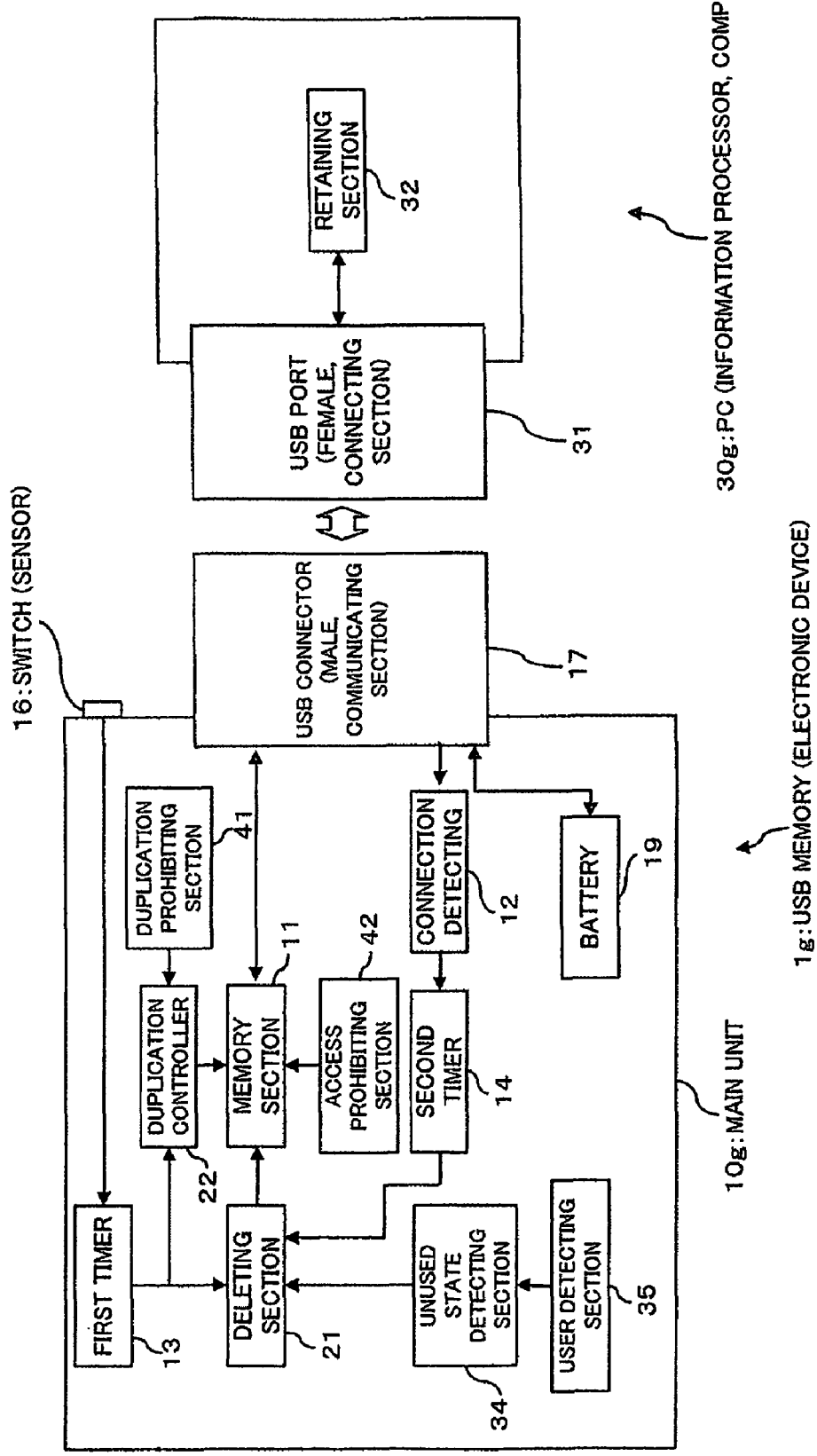
FIG. 13 is a diagram schematically showing a functional construction of a USB memory and a PC which is used with the USB memory connected thereto according to a fifth embodiment of the present invention.

FIG. 13 is a diagram schematically showing a functional construction of a USB (Universal Serial Bus) memory 1g and a PC (information processing apparatus, computer) 30g which is used with the USB memory 1g coupled thereto according to a fifth embodiment of the present invention.

Similar to the USB memory 1a according to the first embodiment, in the USB memory (electronic apparatus) 1g according to the fifth embodiment, the USB connector 17 of the USB memory 1g is inserted/connected to a USB port 31 of the PC 30g, the USB memory 1g being thereby connected to the PC 30g in a communicable manner therebetween, and data writing, data reading, and data deleting in the storage unit 11 of the USB memory 1g are performed from the PC 30g.

As shown in FIG. 13, the PC 30g according to the fifth embodiment includes: a USB port [USB connector (female); connection unit] 31; and a storage unit 32.

In this instance, similar to the PC 30a according to the first embodiment, since the PC 30g has a hardware construction as shown in FIG. 3, its detailed description will be omitted here.

The storage unit 32, which stores various kinds of data, stores the data stored in the storage unit 11 in obedience to control performed by a copy controlling unit 22, which will be described later. This storage unit 32 is formed by a storage device such as the HDD 305 and the RAM 303 shown in FIG. 3.

As shown in FIG. 13, the main body unit 10g of the USB memory 1g has the construction of the main body unit 10d of the USB memory 1d according to the second embodiment shown in FIG. 8 with a copy controlling unit 22, a copy inhibitor 41, an access inhibitor 42, an unused state detector 34, and a user detector 35, added thereto.

As shown in FIG. 13, the USB memory 1g includes: a main body unit 10g having a USB connector (communication unit, connection terminal) 17 and a storage unit 11; and a cap (component; not illustrated) which has the construction similar to the cap 20a of the USB memory 1a according to the first embodiment and is formed in such a manner that it is removable from the USB connector 17.

Here, in the figure, since the reference characters that are the same as those which are already described indicate the same or approximately the same parts, their detailed descriptions will be omitted.

The first timer 13 measures a time duration that elapses under a state in which the cap is uncapped, from when the switch 16 detects that the cap is uncapped. Upon detection that a fifth predetermined time duration (first predetermined time duration) having been set beforehand elapses under the uncapped state, the first timer 13 outputs a signal (fifth predetermined time duration detection signal) indicating as such to the copy controlling unit 22, which will be described later.

Further, when detecting a sixth predetermined time duration (second predetermined time duration) having been set beforehand elapses under the uncapped state, the first timer 13 outputs a signal (sixth predetermined time duration detection signal) indicating as such to the deleting unit 21.

In this instance, this fifth predetermined time duration is shorter than the sixth predetermined time duration, so that it is possible to back up the data stored in the storage unit 11 before the deleting unit 21 deletes the data.

Further, when detecting that a seventh predetermined time duration (fourth predetermined time duration) having been set beforehand elapses after the connection detector 12 detects that the USB connector 17 is connected to the PC 30g, the second timer 14 outputs a signal (seventh predetermined time duration detection signal) indicating as such to the deleting unit 21.

When detecting that the PC 30g falls in an unused state thereof based on information or the like from the user detector 35 or the like, the unused state detector 34 outputs an unused state detection signal to the deleting unit 21.

The copy controlling unit 22 performs controlling such that the data stored in the storage unit 11 of the USB memory 1g is copied (backed up) in the storage unit 32 provided for the PC 30g. Upon reception of the fifth predetermined time duration signal from the first timer 13, that is, when the first timer 13 detects that the fifth predetermined time duration elapses, the copy controlling unit 22 makes the data stored in the storage unit 11 of the USB memory 1g to be copied in the storage unit 32 provided for the PC 30g, thereby realizing backup of the data stored in the storage unit 11 of the USB memory 1g in the storage unit 32.

When performing backup of the data stored in the storage unit 11 of the USB memory 1g, this copy controlling unit 22 firstly notifies the PC 30g of the amount of information stored in the storage unit 11 together with inquiring the PC 30g of the transmission destination (storage destination; address) of the data to be backed up (reserving the transmission destination and the memory capacity). Then, when the PC 30g sends (notifies) information about the transmission destination in response to the inquiry, the copy controlling unit 22 transmits the data to the thus notified transmission destination (storage unit 32) and makes the storage unit 32 store the transmitted information therein.

In this instance, in a case where the HDD 305 or the like of the PC 30g does not have a capacity large enough to store the data for backup, the PC 30g sends back information indicating the absence of the transmission destination to the USB memory 1g (copy controlling unit 22). Here, it is preferable that the PC 30g makes the display 304 thereof show a message indicating that the backup function is not available.

Further, the storage unit 11 of the USB memory 1g is capable of setting/storing information (a backup transmission completion flag) indicating the completion of the backup to the storage unit 32 in association with information (for example, a file name, etc.) for identifying the data. Upon completion of backup of the data, the copy controlling unit 22 sets "1" to this backup transmission completion flag.

In this instance, this backup transmission flag may be set to each data item stored in the storage unit 11. Further, one backup transmission flag may be set to more than one item of data stored in the storage unit 11.

Still further, for example, when data stored in the storage unit 11 is deleted, the storage unit 11 is capable of setting/storing information (USB memory deletion completion flag), indicating that the data has been deleted by the deleting unit 21, in association with information (for example, filename) identifying the data in the storage unit 11. After deleting data stored in the storage unit 11, the deleting unit 21 sets "1" to this USB memory deletion completion flag.

The copy inhibitor 41 inhibits the copy controlling unit 22 from copying data to the storage unit 32. For example, in a case where the PC 30g is not the one which relates to a specific related person having a specific relationship with the USB memory 1g, the copy inhibitor 41 inhibits the copy controlling unit 22 from copying data to the storage unit 32.

Further, evaluation as to whether or not the PC 30g is the one which relates to a specific related person having a specific relationship with the USB memory 1g, is performed in the following manner. For example, the USB memory 1g registers therein a fingerprint or an ID password for authentication of the PC 30g beforehand. The USB memory 1g accesses the PC 30g to obtain a fingerprint, an ID password or the like for authentication, and performs matching of the information thus obtained from the PC 30g with the previously registered fingerprint, an ID password or the like.

Further, the copy inhibitor 41 inhibits the copy controlling unit 22 from copying data to the storage unit 32 also in a case where a user of the USB memory 1g is not included in specific related people having specific relationships with the USB memory 1g.

The "specific related people having specific relationships with the USB memory 1g" means such people who have any kind of validity in using the USB memory 1g as a user of the USB memory 1g, an owner of the PC 30g, and a person who is permitted to use the USB memory 1g.

Here, a variety of kinds of already known methods can be used for evaluating whether or not a user of the USB memory 1g is one of such specific related people. For example, as shown in the above patent document 1, the storage unit 11 of the USB memory 1g or the like registers therein fingerprints of the specific related people beforehand. When the USB memory 1g is used by a user, fingerprint authentication of the user is performed, and matching of the thus obtained fingerprint data with registration fingerprint data is performed.

The deleting unit 21 deletes data stored in the storage unit 11. The deleting unit 21 deletes data stored in the storage unit 11 when it receives a sixth predetermined time duration detection signal from the first timer 13, that is, when elapse of the sixth predetermined time duration (second predetermined time duration) is detected, and when the deleting unit 21 receives a seventh predetermined time duration detection signal from the second timer 14.

In addition, in a case where data stored in the storage unit 11 is copied to the storage unit 32 of the PC 30g, the deleting unit 21 deletes the data stored in the storage unit 11. Concretely, when "1" is set to the backup transmission flag set in the storage unit 11, the deleting unit 21 deletes the data in the storage unit 11, in which data, "1" is set to the backup transmission completion flag.

Further, when the deleting unit 21 deletes the data stored in the storage unit 11, the deleting unit 21 sets "1" to the USB memory deletion completion flag with respect to the data deleted from the storage unit 11 after completion of data deleting from the storage unit 11.

In this instance, the deleting unit 21 may delete data stored in the storage unit 11 only when the user of the PC 30g is one of the specific related people having specific relationships with the PC 30g.

The access inhibitor 42 inhibits the PC 30g from accessing the storage unit 11. This access inhibitor 42 inhibits an access from the PC 30g to the storage unit 11, when a user of the PC 30g is not one of the specific related people having specific relationships with the PC 30g.

Further, when a user of the USB memory 1g is not one of the specific related people having specific relationships with the USB memory 1g, the access inhibitor 42 inhibits the PC 30g from accessing the storage unit 11.

In the USB memory 1g according to the fifth embodiment of the present invention with the above construction, when the cap of the USB memory 1g is uncapped from the USB connector 17 of the USB memory 1g, the cap detection switch 109 detects that the cap has been uncapped (detecting step). Then, the main body unit 10g of the USB memory 1g is powered on, and initializing processing is performed in each unit of the main body unit 10g.

Then, the first timer 13 measures a time duration that elapses under the uncapped state from when the switch 16 detects the uncapped state (measuring step).

When the USB memory 1g is connected to the USB port 31 of the PC 30g, the USB interface (connection detecting unit 12) 106 detects that the main body unit 10g is connected (USB connection) to the USB port 31 of the PC 30a, and the second timer 14 measures (countdowns) a time duration that elapses at a state in which the USB connector 17 is being connected to the PC 30a.

When detecting the fifth predetermined time duration having been set beforehand elapses under the uncapped state, the first timer 13 outputs a fifth predetermined time duration detection signal to the copy controlling unit 22.

The copy controlling unit 22, which received the fifth predetermined time duration from the first timer 13, performs controlling such that the data stored in the storage unit 11 of the USB memory 1g is copied (backed up) in the storage unit 32.

More precisely, the copy controlling unit 22 notifies the PC 30g of the amount of information stored in the storage unit 11 together with inquiring the PC 30g of the transmission destination of the data. The copy controlling unit 22 performs data transmission (copying) based on a response from the PC 30g (copying step). Further, at that time, the transmission destination of the backup data and the amount of data transmitted (the transmission amount) are held in association with information identifying the transmitted data (for example, file name).

The PC 30g stores the data transmitted from the USB memory 1g in the storage unit 32 together with sending a signal (completion report) indicating that the transmission is completed, while the copy controlling unit 22 sets "1" to this backup transmission completion flag.

After that, the deleting unit 12 deletes the data stored in the storage unit 11 (deleting step), and sets "1" to the USB memory deletion completion flag with respect to the deleted data.

Further, when detecting the sixth predetermined time duration having been set beforehand elapses under an uncapped state, the first timer 13 outputs a sixth predetermined time duration detection signal to the deleting unit 21. When detecting the seventh predetermined time duration having been set beforehand elapses from when the USB connector 17 is connected to the PC 30a, the second timer 14 also outputs a seventh predetermined time duration detection signal to the deleting unit 21.

Further, when detecting that the PC 30g falls in an unused state thereof based on information or the like from the user detector 35, the unused state detector 34 outputs an unused state detection signal to the deleting unit 21.

Upon reception of the sixth predetermined time duration detection signal, the seventh predetermined time duration detection signal, or the unused state detection signal, the deleting unit 21 deletes data stored in the storage unit 11.

According to the PC 30g, it is possible to evaluate whether or not backup of the data has been completed by means of referring to the backup transmission completion flag, and it is also possible to evaluate whether or not data deletion from the USB memory 1g has been completed by means of referring to the USB memory deletion completion flag.

Further, at the time the copy controlling unit 22 makes data stored in the storage unit 11 to be copied to the storage unit 32 provided for the PC 30g, the copy inhibitor 41 inhibits data copying by the copy controlling unit 22 to the storage unit 32 in a case where, for example, it is admitted that the PC 30g is not the one which relates to specific related people having specific relationships with the USB memory 1g, or that a user of the USB memory 1g is not one of the specific related people having specific relationships with the USB memory 1g.

Further, when deciding that a user of the PC 30g is not one of the specific related people having specific relationships with the USB memory 1g, the access inhibitor 42 inhibits accessing from the PC 30g to the storage unit 11.

Further, when the copy controlling unit 22 restores the data, which is backed up in the storage unit 32 of the PC 30g, in the USB memory 1g, an operator, for example, inputs a restoring instruction through the keyboard 306 of the PC 30g or the mouse 307.

In a case where such data instruction is issued, the USB memory 1g obtains the destination of the data transmitted from the storage unit 11 and the amount of data. On the basis of such information, the USB memory 1g obtains the data to be restored from the storage unit 32 and transmits the data to the USB memory 1g (storage unit 11), thereby being capable of restoring the backed up data. In this manner, when data restoring is performed, the backup transmission completion flag and the USB memory deletion operation flag fall in the state of being "0".

As described above, with the USB memory 1g and the PC 30g according to the fifth embodiment of the present invention, it is not only possible to obtain the effects and benefits similar to those of the second embodiment, but it is also possible to prevent the data stored in the USB memory 1g from being lost since the data stored in the storage unit 11 of the USB memory 1g is copied (backed up) in the storage unit 32 of the PC 30g.

Further, at that time, the copy inhibitor 41 inhibits data copying by the copy controlling unit 22 to the storage unit 32 in a case where, for example, it is admitted that the PC 30g is not the one which relates to specific related people having specific relationships with the USB memory 1g or in a case it is admitted that a user of the USB memory 1g is not one of the specific related people having specific relationships with the USB memory 1g. Thus, the data stored in the storage unit 11 of the USB memory 1g is never backed up in the PC 30g when the third person illegally uses the USB memory 1g or the PC 30g. This makes it possible to prevent illegal use of the USB memory 1g and the PC 30g, so that the confidentiality of data can be improved.

Still further, the access inhibitor 42 inhibits accessing from the PC 30g to the storage unit 11, when it is admitted that a user of the PC 30g is not one of the specific related people having specific relationships with the PC 30g. This also makes it possible to prevent illegal use of the data stored in the storage unit 11 in the USB memory 1g, so that the confidentiality of data can be improved.

(H) Sixth Embodiment

Figure 14:
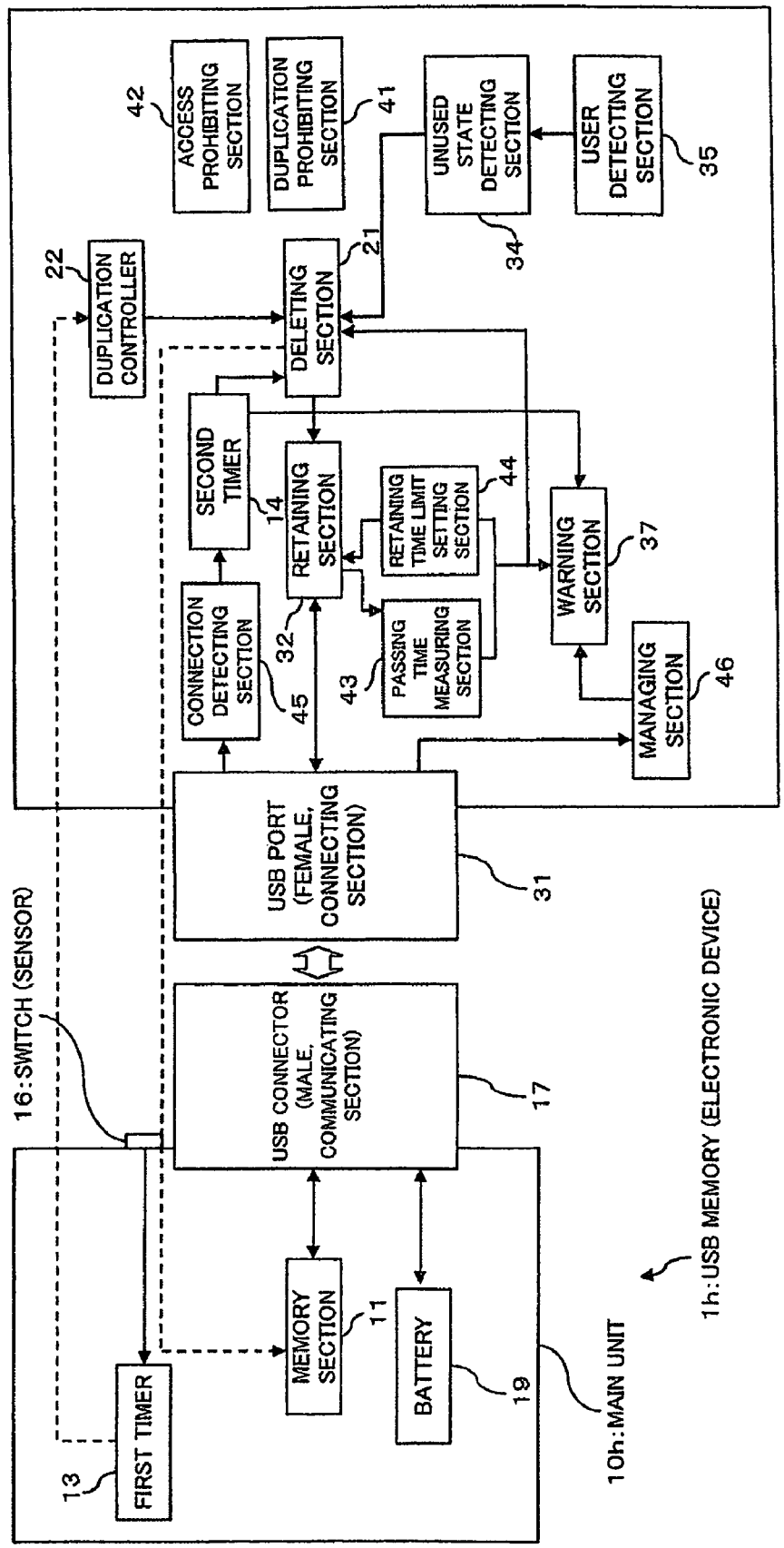
FIG. 14 is a diagram schematically showing a functional construction of a USB memory and a PC which is used with the USB memory connected thereto according to a sixth embodiment of the present invention.

FIG. 14 is a diagram schematically showing a functional construction of a USB (Universal Serial Bus) memory 1h and a PC (information processing apparatus, computer) 30h according to a sixth embodiment of the present invention.

Similar to the already described first embodiment, in the USB memory (electronic apparatus) 1h and the PC 30h according to the sixth embodiment, the USB connector (communication unit, connection terminal) 17 of the USB memory 1h is inserted/connected to the USB port 31 of the PC 30h, the USB memory 1h being thereby connected to the PC 30h in a communicable manner therebetween, and data reading, data writing, data deleting or the like in the storage unit 11 of the USB memory 1h is performed from the PC 30h.

As shown in FIG. 14, the PC 30h according to the sixth embodiment includes: a copy controlling unit 22; a copy inhibitor 41; a deleting unit 21; an access inhibitor 42; a second timer 14; a connection detector 12; an unused state detector 34; and a user detector 35, which are provided for the main body unit 10g of the USB memory 1g according to the fifth embodiment shown in FIG. 13. Further, the PC 30h is provided with an elapse time obtaining unit 43; a storage time limit setting unit 44; an alerting unit 37; and a management unit 46.

Further, the main body unit 10g has a cap (component; non-illustrated) having the similar construction to that of the cap 20a of the USB memory 1a according to the first embodiment, which cap is removable from the USB connector 17.

Here, in the figure, since the reference characters the same as those which are already described indicate the same or approximately the same parts, their detailed descriptions will be omitted.

In addition, similar to the PC 30a according to the first embodiment, the PC 30h according to the sixth embodiment has a hardware construction as shown in FIG. 3, and thus, its detailed description will be omitted.

The elapse time obtaining unit 43 obtains a time duration that elapses from when the latest access is made to data stored in the storage unit 11 or the storage unit 32. For example, the elapse time obtaining unit 43 manages dates and times at which data accesses are made, and measures an time duration that elapses from the time of this access by using a timer (not illustrated), and calculates an elapse time duration by means of obtaining a difference from the current time, thereby obtaining the elapse time duration.

The storage time limit setting unit 44 gives the data stored in the storage unit 11 or the storage unit 32 a time limitation of data storage therein.

Here, as a specific method for setting the specific storage time limitation, there are methods of such as making a management table in a dedicated area provided inside the USB memory 1h to manage information (storage time limitation information) relating to the storage time limitation, and embedding the storage time limitation information in a standard file property information area of an OS (Operating System) such as Windows (registered trademark). With such methods, it is possible to set the storage limitation of the data.

In this manner, on the basis of the storage time limitation set to each data item, data whose storage time limit will come in the nearest future is extracted, and the storage time limit of this data is set to a timer (not illustrated).

Then, when a notification that the storage time limit has run out is notified by this timer, the data is deleted, and then, the storage time limit of data whose storage time limit will come in the next place is newly set to the timer. Here, in a case where there are data items whose storage time limits are the same, such storage time limits can be set with some deviation thereof.

Further, setting of the storage time limitation to the timer can be performed by using a dedicated command to the USB memory 1h, or by diverting the data writing in the dedicated area, and various types of methods can be used.

In this instance, to realize the above methods, it is preferable to provide the PC 30h with software for managing storage time limits, and also to provide the USB memory 1h with firmware for management.

When detecting an eighth predetermined time duration (second predetermined time duration) having been set beforehand elapses from when the connection detector 12 detects that the USB connector 17 is connected to the PC 30h, the second timer 14 outputs a signal indicating as such (an eighth predetermined time duration detection signal) to the alerting unit 37. Further, when detecting a ninth predetermined time duration (first predetermined time duration) having been set beforehand elapses from when the connection detector 12 detects that the USB connector 17 is connected to the PC 30h, the second timer 14 outputs a signal indicating as such (a ninth predetermined time duration detection signal) to the deleting unit 21.

The alerting unit 37 gives an alert in a case where any of the elapse time durations, obtained by the elapse time obtaining unit 43, of the data stored in the storage unit 11 or the storage unit 32 is longer (the storage time limit has been out) than the storage time limit set by the storage time limit setting unit 44.

Further, the alerting unit 37 gives an alert when it receives the eighth predetermined time duration detection signal from the second timer 14.

In this instance, similar to the USB memory 1e according to the third embodiment, this alerting unit 37 gives an alert when the timer 13 detects that the sixth predetermined time duration (second predetermined time duration), having been set beforehand, elapses.

Further, the alerting unit 37 may give an alert when the first timer 13 detects that a time duration, that elapses under the uncapped state from when the cap is uncapped from the USB connector 17, is longer than a predetermined time duration.

Still further, in the PC 30h according to the sixth embodiment, the deleting unit 21 deletes an item of data stored in the storage unit 11 or the storage unit 32 in a case where the elapse time duration of the data item, which elapse time duration is obtained by the elapse time obtaining unit 43, is longer than the predetermined storage limit, set by the storage time limit setting unit 44, by the ninth predetermined time duration (the first predetermined time duration).

Further, the above described storage time limit and predetermined time duration for the deleting unit 21 to perform deletion can be arbitrarily set by a user through the keyboard 306 or the like.

The management unit 46 registers beforehand therein information identifying the USB memory 1h for managing the information, and it registers beforehand therein information (identification information) identifying the USB memory 1h which is permitted to be connected to the PC 30h.

More precisely, a registration system for the USB memory 1h is previously employed. The management unit 46 assigns a management number and/or a management ID (IDentification) beforehand to the USB memory 1h which is permitted to be connected to the PC 30h, and the management unit 46 manages them in the form of a management table.

Then, referring to this management unit 46 (management table), the alerting unit 37 gives an alert at the time a USB memory 1h which is not managed by the management unit 46 is connected to the USB port 31.

In the PC 30h according to the sixth embodiment having the above described construction, when the USB memory 1h is connected to the USB port 31, the data stored in the storage unit 11 is searched in terms of whether or not there is information to be managed such as the above described storage time limitation and a predetermined time duration for performing deletion or the like.

Here, in a case where there is data to which a storage time limit and/or a predetermined time duration for performing deletion are set, the elapse time obtaining unit 43 or the like evaluates if the storage time limit has been out. If the storage time limit is out, the alerting unit 37 gives an alert.

Furthers in a case where there is an data item whose elapse time duration obtained by the elapse time obtaining unit 43 is longer than the storage time limit by a length not shorter than a predetermined time duration (the ninth predetermined time duration), the deleting unit 21 deletes the data item.

Further, when the USB memory 1h is connected to the USB port 31, the PC 30h obtains the identification information of this USB memory 1h through the USB connector 17 and the USB port 31. When it is detected that the USB memory 1h connected to the USB port 31 is not managed in the management unit 46 with reference to this management unit 46, the alerting unit 37 gives an alert.

Further, it can also be performed to inhibit access to the HDD 305 or the like in the PC 30h, or to make the inserted USB memory not usable as well as giving an alert by the alerting unit 37.

Here, in the PC 30h, even when the USB memory 1h connected to the USB port 31 is the one which is managed by the management unit 46, the second timer 14 measures a time duration that elapses from when an USB memory 1h is connected to the USB port 31, and an alert is given when it is detected that the eighth predetermined time duration elapses. With this arrangement, it is possible for the USB memory 1h to prevent the USB memory 1h from being left in a state in which it is connected to the USB port 31 of the PC 30h.

In this manner, with the USB memory 1h and the PC 30h according to the sixth embodiment, not only the effects and benefits of the fifth embodiment are realized but it is also possible to improve the confidentiality of data by means of deleting data whose storage time limit has been run out if such data is present, thereby preventing the leakage of such data. This makes it possible to improve the confidentiality of the data.

Further, since an alert is given when there is data whose storage time limit has been out, it is possible to notify an operator of such, thereby making it possible for the operator to perform the optimal processing to the data, such as deletion of the data, so that the confidentiality of data is improved and high convenience is also realized.

Still further, when a USB memory 1h which is not registered (non-registered) is connected to the USB port 31, the alerting unit 37 alerts the alerting unit 37. Thus, for example, it is possible to prevent a third person from obtaining the data stored in the PC 30h by using such an unregistered USB memory 1h, and so that the confidentiality of the information stored in the PC 30h is improved.

(I) Others

Here, the CPU (Central Processing Unit) of the information processing apparatus (PCs 30a, 30e, 30g, and 30h) executes a management program, thereby functioning as the copy controlling unit 22, the access inhibitor 42, the copy inhibitor 41, the deleting unit 21, the elapse time obtaining unit 43, the storage time limit setting unit 44, the copy inhibitor 41, the deleting unit 21, the elapse time obtaining unit 43, the storage time limit setting unit 44, the management unit 46, the unused state detector 34, the user detector 35, the user confirming unit 38, the USB memory confirming unit 40, and the alert controller 33, which are already described.

In this instance, programs (management programs) for realizing the functions of these copy controlling unit 22, access inhibitor 42, copy inhibitor 41, deleting unit 21, elapse time obtaining unit 43, storage time limit setting unit 44, management unit 46, unused state detector 34, user detector 35, user confirming unit 38, USB memory confirming unit 40, and alert controller 33, are offered in the form of computer-readable recording media such as flexible discs, CDs (CD-ROMs, CD-Rs, CD-RWs, and the like), and DVDs (DVD-ROMs, DVD-RAMs, DVD-Rs, DVD+Rs, DVD-RWs, DVD+RWs, and the like). The computer reads the programs from such recording media to transfer the programs to an internal or external storage device, which stores the program therein. Alternatively, the programs can be recorded in storage devices (recording media) such as magnetic discs, optical discs, and magneto-optical discs, to be transferred to the computer over a communication network. The computer reads the programs from such recording media to transfer the program to an internal or an external storage device, to store the program therein. Alternatively, the programs can be recorded in storage devices (recording media) such as magnetic discs, optical discs, and magnet-optical discs, to be transferred to the computer over a communication network.

At the time of realizing the functions of the copy controlling unit 22, the access inhibitor 42, the copy inhibitor 41, the deleting unit 21, the elapse time obtaining unit 43, the storage time limit setting unit 44, the management unit 46, the unused state detector 34, the user detector 35, the user confirming unit 38, the USB memory confirming unit 40, and the alert controller 33, the programs stored in the internal storage apparatus (for example, the RAM 303 and the ROM 302) are executed by the microprocessor (the CPU 301 in the present embodiment). At that time, the programs recorded in such recording medium can be read by the computer which then executes those read-out programs.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a microprocessor such as a CPU and a means for reading computer programs from recording media. In the present embodiment, the PCs 30a, 30e, 30g, and 30h have functions as computers.

Further, as recording media used in the embodiments of the present invention, not only the above-mentioned flexible discs, CDs, DVDs, magnetic discs, optical discs, and magneto-optical discs, but also various types of other computer-readable media, such as IC cards, ROM cartridges, magnetic tapes, punch cards, internal storage devices (memories such as a RAM and a ROM) of the computer, external storage devices, and printed matter with any codes such as barcodes printed thereon, are also applicable.

Still further, the processors 102 of the USB memories 1a through 1g execute the USB memory management program stored in the inner storage apparatus (for example, the RAM 103 and the control soft ROM 104), thereby functioning as the copy controlling unit 22, the access inhibitor 42, the copy inhibitor 41, the deleting unit 21, the elapse time obtaining unit 43, the storage time limit setting unit 44, the management unit 46, the unused state detector 34, the user detector 35, the user confirming unit 38, the USB memory confirming unit 40, and the alert controller 33.

Yet further, the present invention should by no means be limited to the above-illustrated embodiments, and various changes or modifications may be suggested without departing from the gist of the invention.

For example, in the above described first embodiment, third to fifth embodiments, and modified examples of these embodiments, the alerting unit 15 is formed by the buzzer circuit 108 which generates an alarming sound at a specific frequency, thereby giving a user an alert that acts on the auditory sense. However, the present invention should by no means be limited to this, and an alert can be given by a variety of kinds of methods which give various kinds of stimulations to the senses (the senses of seeing, touching, tasting, and smelling) such as generating a vibration by a vibration generating circuit and turning on a light.

In addition, the alerting unit 15 according to the first embodiment 1a can be provided for the USB memory 1d. When the first timer 13 detects elapse of the first predetermined time duration and when the second timer 14 detects elapse of the second predetermined time duration, the alerting unit 15 gives an alert prior to deletion of the data stored in the storage unit 11 by the deleting unit 21, thereby notifying a user that data deletion will be performed. This makes it possible for a user to previously know that the data stored in the storage unit 11 will be deleted, so that high convenience is realized.

Further, the alerting unit 15 and the battery measuring unit 18 according to the first embodiment 1a can be provided for the USB memory 1d of the second embodiment. When the battery measuring unit 18 detects that the remaining battery amount of the battery 19 becomes not larger than the predetermined amount, the alerting unit 15 gives an alert. This makes it possible for a user to know that the remaining battery amount has become small, so that high convenience is realized.

Still further, in the USB memories 1g and 1h according to the fifth embodiment and the sixth embodiment, respectively, when the unused state detector 34 detects transition of the PC 30g, 30h into an unused state thereof, the copy controlling unit 22 may make the data stored in the storage unit 11 to be copied in the storage unit 32 of the PC 30g, 30h, and may back up the data stored in the storage unit 11 of the USB memory 1g, 1h and then delete the data from the storage unit 11 of the USB memory 1g, 1h.

Here, the unused state detector 34 may detect the transition of the PCs 30g, 30h into the unused state thereof by means of detecting power breakage of the PC 30g, 30h or by means of detecting shift of the PC 30g, 30h to a power-saving operation mode.

Further, in the above described embodiments and modified examples of these embodiments, a description is made of an example in which the electronic apparatus is a USB memory. However, the present invention should by no means be limited to this, and the electronic apparatus can be, for example, an electronic apparatus that supports another communication protocol and/or bus standard regulations such as the IEEE 1394 (FireWire) regulations. In addition, the present invention can be applied to electronic apparatuses other than a memory. In this instance, like the USB, this IEEE 1394 can supply power with bus power.

Further, in the above described embodiments and modified examples of these embodiments, a description is made of an example in which a component is the cap of a USB memory. However, the present invention should by no means be limited to this, and a case that accommodates therein a USB memory, the other types of portable recording apparatuses, and the main bodies of the electronic apparatuses other than a memory, is also a component included in the present invention.

Still further, in the above described embodiments, and the modified examples of these embodiments, a description is made of an example in which the communication unit of the electronic apparatus is a connection terminal which is electrically coupled to the information processing apparatus. However, the present invention should by no means be limited to this, and this communication unit can be the one which makes possible wireless communication between the electronic apparatus and the information processing apparatus. In this case, also, the connection unit of the information processing apparatus can be formed by the one which is capable of performing radio communication with the electronic apparatus.

Yet further, in the above described embodiments and modified examples of these embodiments, at least some of the first through seventh predetermined time durations may be set by a user arbitrarily.

Furthermore, a description is made of an example in which the PC 30h shown in the sixth embodiment is provided with the elapse time obtaining unit 43 and the storage time limit setting unit 44. However, the present invention should by no means be limited to this, and an elapse time obtaining unit 43 and a storage time limit setting unit 44 can be provided for the USB memories 1a, 1b, 1c, 1d, 1e, 1f, and 1g, and the PCs 30a, 30e, 30g, and 30h, according to the other embodiments and their modified examples.

Moreover, in the USB memory 1d according to the second embodiment, the USB memory 1g according to the fifth embodiment, and the USB memory 1h according to the sixth embodiment, the battery measuring unit 18 can be provided for the battery 19. When the battery measuring unit 18 detects that the remaining battery amount in the battery 19 becomes not larger than a predetermined value, the alerting unit 15 gives an alert.

Here, with the disclosure of each of the embodiments of the present invention, it is possible for the ordinarily skilled in the art to implement and manufacture the present invention.

INDUSTRIAL APPLICABILITY

The present invention is applicable to management of a variety of kinds of electronic apparatuses that are connected to an information processing apparatus in a communicable manner therebetween with various types of regulations such as the USB and the IEEE 1394 (FireWire).

What is claimed is:
1. An electronic apparatus comprising:
a body;
a communication unit to communicably connect the body of the electronic apparatus to an information processing apparatus, the information processing apparatus comprising a storage unit;
a part to be detachably attached to the body of the electronic apparatus;
a recording unit adapted to store data;
a sensor which detects detachment of the part from the body of the electronic apparatus;
a timer which measures a time duration that elapses until the part is attached to the body of the electronic apparatus after the detachment of the part is detected by the sensor;
a copy controlling unit which copies the data in the recording unit to the storage unit of the information processing apparatus in response to the timer detecting elapse of a first predetermined time duration; and a deleting unit which deletes the data stored in the recording unit in response to the data in the recording unit being copied to the storage unit of the information processing apparatus.

2. An electronic apparatus as set forth in claim 1, wherein the deleting unit deletes data in the recording unit in response to the timer detecting elapse of a second predetermined time duration, when data stored in the recording unit is copied in the storage unit.

3. An electronic apparatus as set forth in claim 1, wherein the copy controlling unit copies data in the recording unit to the storage unit of the information processing apparatus when the information processing apparatus has a specific relationship with a specific relating person who has a specific relationship with the electronic apparatus.

4. An electronic apparatus as set forth in claim 1, further comprising an unused state detecting unit which detects transition of the information processing apparatus to an unused state, wherein
the copy controlling unit copies the data in the recording unit to the storage unit of the information processing apparatus in response to the unused state detecting unit detecting transition of the information processing apparatus to the unused state.

5. An electronic apparatus as set forth in claim 4, wherein the unused state detecting unit detects the transition of the information processing apparatus to the unused state in response to detecting power-off of the information processing apparatus.

6. An electronic apparatus as set forth in claim 4, wherein the unused state detecting unit detects the transition of the information processing apparatus to the unused state in response to detecting the information processing apparatus being transitioned to a power-saving operation mode.

7. An electronic apparatus as set forth in claim 4, further comprising a user detecting unit which detects the presence of a user of the information processing apparatus, wherein
the unused state detecting unit detects the transition of the information processing apparatus to the unused state in response to the user detecting unit ceasing detecting the presence of the user.

8. An electronic apparatus as set forth in claim 1, wherein the copy controlling unit copies the data in the recording unit to the storage unit of the information processing apparatus when a user of the electronic apparatus is a specific relating person who has a specific relationship with the electronic apparatus.

9. An electronic apparatus as set forth in claim 1, further comprising a copy inhibiting unit which inhibits copying of data in the storage unit.

10. An electronic apparatus as set forth in claim 9, wherein the copy inhibiting unit inhibits the copy controlling unit from copying data in the storage unit when a user of the electronic apparatus is not a specific relating person who has a specific relationship with the electronic apparatus.

11. An electronic apparatus as set forth in claim 1, further comprising an access inhibiting unit which inhibits the information processing apparatus from accessing the recording unit.

12. An electronic apparatus as set forth in claim 11, wherein the access inhibiting unit inhibits the information processing apparatus from accessing the recording unit when a user of the electronic apparatus is not a specific relating person who has a specific relationship with the electronic apparatus.

13. An information processing apparatus, comprising:
a connection unit to be communicably connected to a body of an electronic apparatus, the electronic apparatus comprising the body, a part to be detachably attached to the body, a communication unit which enables communication with the information processing apparatus, and a recording unit adapted to store data;
a storage unit which is adapted to store data;
a copy controlling unit which copies the data in the recording unit of the electronic apparatus to the storage unit in response to elapse of a first predetermined time duration after the part of the electronic apparatus is detached from the body of the electronic apparatus; and
a deleting unit which deletes data stored in the recording unit of the electronic apparatus in response to elapse of a second predetermined time duration after the part of the electronic apparatus is detached from the body of the electronic apparatus.

14. An information processing apparatus as set forth in claim 13, further comprising an unused state detecting unit which detects transition of the information processing apparatus to an unused state,
the copy controlling unit copies data in the memory unit to the storage unit of the information processing apparatus in response to the unused state detecting unit detecting transition of the information apparatus to the unused state.

15. An information processing apparatus as set forth in claim 13, wherein the deleting unit deletes data in the recording unit when a user of the information processing apparatus is a specific relating person having a specific relationship with the information processing apparatus.

16. An information processing apparatus as set forth in claim 14, further comprising a user detecting unit which detects the presence of a user of the information processing apparatus, wherein
the unused state detecting unit detects the transition of the information processing apparatus to the unused state in response to the user detecting unit ceasing detecting the presence of the user.

17. An information processing apparatus as set forth in claim 13, further comprising:
a storage time limit setting unit which sets a storage time limit to the data stored in the recording unit or the storage unit;
an elapse time obtaining unit which obtains a time duration that elapses after the latest access to the data stored in the recording unit or the storage unit; and
an alerting unit which issues an alert in response to the elapsed time duration exceeding the storage time limit.

18. An information processing apparatus as set forth in claim 17, the deleting unit being operable to delete the data stored in the recording unit or the storage unit, and the deleting unit deleting the data in response to the elapsed time duration exceeding the storage time limit and reaching a third predetermined time duration.

19. An information processing apparatus as set forth in claim 13, wherein an alert is issued in response to a time duration not shorter than a fourth predetermined time duration elapsing after the electronic apparatus is connected to the connection unit.

20. An information processing apparatus as set forth in claim 13, wherein an alert is given in response to a time duration not shorter than a third predetermined time duration elapsing after the latest access to the data stored in the recording unit.

* * * * *

UNITED STATES PATENT AND TRADEMARK OFFICE
CERTIFICATE OF CORRECTION

PATENT NO. : 8,127,364 B2  
APPLICATION NO. : 12/239948  
DATED : February 28, 2012  
INVENTOR(S) : Nobuyuki Koike et al.

Page 1 of 1

It is certified that error appears in the above-identified patent and that said Letters Patent is hereby corrected as shown below:

First Page, Column 1, in the Issued Patent, Under the Prior Publication Data, insert -- Related U.S. Application Data

(63) Continuation of application No. PCT/JP2006/306739, filed on March 30, 2006. --

Signed and Sealed this
Thirty-first Day of July, 2012

David J. Kappos
*Director of the United States Patent and Trademark Office*